US009254591B2

(12) United States Patent
Fox et al.

(10) Patent No.: US 9,254,591 B2
(45) Date of Patent: Feb. 9, 2016

(54) DEEP DRAW METHOD OF MAKING IMPACT AND VIBRATION ABSORBING ARTICLES AND THE ARTICLES FORMED THEREBY

(75) Inventors: Richard B. Fox, Smithfield, RI (US); Daniel M. Wyner, North Scituate, RI (US); Jack Waksman, South Easton, MA (US); James E. Gaudet, Blackstone, MA (US)

(73) Assignee: POLYWORKS, INC., North Smithfield, RI (US)

( * ) Notice: Subject to any disclaimer, the term of this patent is extended or adjusted under 35 U.S.C. 154(b) by 565 days.

(21) Appl. No.: 12/423,174

(22) Filed: Apr. 14, 2009

(65) Prior Publication Data

US 2009/0255625 A1    Oct. 15, 2009

Related U.S. Application Data

(60) Provisional application No. 61/044,859, filed on Apr. 14, 2008.

(51) Int. Cl.
*B32B 3/30* (2006.01)
*B29C 44/14* (2006.01)
(Continued)

(52) U.S. Cl.
CPC ............ *B29C 44/146* (2013.01); *A43B 13/187* (2013.01); *B29D 35/142* (2013.01); *B29D 35/148* (2013.01); *B32B 3/30* (2013.01); *B32B 5/022* (2013.01); *B32B 5/024* (2013.01); *B32B 5/026* (2013.01); *B32B 5/20* (2013.01); *B32B 5/245* (2013.01); *B32B 7/06* (2013.01); *B32B 7/12* (2013.01); *B32B 15/046* (2013.01); *B32B 25/045* (2013.01); *B32B 25/14* (2013.01); *B32B 27/065* (2013.01); *B32B 27/16* (2013.01); *B32B 27/18* (2013.01); *B32B 27/283* (2013.01); *B32B 27/302* (2013.01); *B32B 27/304* (2013.01); *B32B 27/32* (2013.01); *B32B 27/36* (2013.01);
(Continued)

(58) Field of Classification Search
CPC ............... Y10T 428/24174; Y10T 428/24521; A43B 13/145; A43B 13/187; B32B 3/08; B32B 3/30; B32B 27/12; B32B 27/40; B32B 2437/02
USPC ........... 428/120, 172; 267/142; 248/562, 634; 36/34 A, 44; 5/645, 655.5, 731, 740
See application file for complete search history.

(56) References Cited

U.S. PATENT DOCUMENTS 1,596,347 A    8/1926  Gilowitz
1,625,582 A    4/1927  Anderson
(Continued)

FOREIGN PATENT DOCUMENTS

JP    05-339399    12/1993
WO    WO97/26821    7/1997
(Continued)

OTHER PUBLICATIONS

WO 2007/100922, Sep. 2007.*
(Continued)

*Primary Examiner* — Donald J Loney
(74) *Attorney, Agent, or Firm* — Michael J. Young

(57) ABSTRACT

The present disclosure relates to cushioning members, methods of making and methods of using, particularly to cushioning members comprising a plurality of spaced apart pillars comprising a polymeric material.

40 Claims, 14 Drawing Sheets

(51) Int. Cl.
  *A43B 13/18*    (2006.01)
  *B29D 35/14*    (2010.01)
  *B32B 27/40*    (2006.01)
  *B32B 5/02*     (2006.01)
  *B32B 5/20*     (2006.01)
  *B32B 5/24*     (2006.01)
  *B32B 7/06*     (2006.01)
  *B32B 7/12*     (2006.01)
  *B32B 15/04*    (2006.01)
  *B32B 25/04*    (2006.01)
  *B32B 25/14*    (2006.01)
  *B32B 27/06*    (2006.01)
  *B32B 27/16*    (2006.01)
  *B32B 27/18*    (2006.01)
  *B32B 27/28*    (2006.01)
  *B32B 27/30*    (2006.01)
  *B32B 27/32*    (2006.01)
  *B32B 27/36*    (2006.01)
  *B32B 29/00*    (2006.01)
  *A43B 13/14*    (2006.01)

(52) U.S. Cl.
  CPC .............. *B32B 27/40* (2013.01); *B32B 29/007* (2013.01); *A43B 13/145* (2013.01); *B32B 2255/00* (2013.01); *B32B 2255/26* (2013.01); *B32B 2262/02* (2013.01); *B32B 2262/06* (2013.01); *B32B 2262/067* (2013.01); *B32B 2262/14* (2013.01); *B32B 2266/0207* (2013.01); *B32B 2266/0278* (2013.01); *B32B 2266/0292* (2013.01); *B32B 2270/00* (2013.01); *B32B 2274/00* (2013.01); *B32B 2307/402* (2013.01); *B32B 2307/50* (2013.01); *B32B 2307/546* (2013.01); *B32B 2307/58* (2013.01); *B32B 2307/5825* (2013.01); *B32B 2307/7145* (2013.01); *B32B 2307/726* (2013.01); *B32B 2307/7246* (2013.01); *B32B 2307/734* (2013.01); *B32B 2437/00* (2013.01); *B32B 2437/02* (2013.01); *B32B 2535/00* (2013.01); *B32B 2555/00* (2013.01); *Y10T 428/24174* (2015.01); *Y10T 428/24521* (2015.01)

(56) References Cited

U.S. PATENT DOCUMENTS

| | | | |
|---|---|---|---|
| 2,449,373 A | | 9/1948 | Falge et al. |
| 2,631,407 A | | 3/1953 | Rempel |
| 2,668,394 A | | 2/1954 | Auzin |
| 2,698,272 A | | 12/1954 | Clapp et al. |
| 2,956,313 A | | 10/1960 | Choice |
| 2,960,794 A | | 11/1960 | Johns |
| 3,293,671 A | * | 12/1966 | Griffin ................... 5/655.9 |
| 3,605,145 A | * | 9/1971 | Graebe ................... 5/706 |
| 3,982,335 A | | 9/1976 | Cunningham et al. |
| 4,009,298 A | | 2/1977 | Cavanagh |
| 4,168,754 A | | 9/1979 | Nyholm |
| 4,234,640 A | | 11/1980 | Wittel |
| 4,240,224 A | | 12/1980 | Katzman et al. |
| 4,242,398 A | | 12/1980 | Segawa et al. |
| 4,275,473 A | * | 6/1981 | Poirier ................... 441/128 |
| 4,292,735 A | | 10/1981 | Thillays |
| 4,369,284 A | | 1/1983 | Chen |
| 4,381,579 A | | 5/1983 | Rumpp |
| 4,415,954 A | | 11/1983 | Schaefer |
| 4,416,166 A | | 11/1983 | Jannard et al. |
| 4,429,915 A | | 2/1984 | Flager |
| 4,476,742 A | | 10/1984 | Midgley |
| 4,538,787 A | | 9/1985 | Fox et al. |
| 4,552,944 A | | 11/1985 | Kamiyama et al. |
| 4,581,187 A | | 4/1986 | Sullivan et al. |
| 4,611,851 A | | 9/1986 | Noyes et al. |
| 4,666,782 A | | 5/1987 | Tada et al. |
| 4,683,671 A | | 8/1987 | Farrar |
| 4,716,662 A | | 1/1988 | Bar |
| 4,722,946 A | | 2/1988 | Hostettler |
| 4,794,658 A | | 1/1989 | Goodale |
| 4,805,319 A | | 2/1989 | Tonkel |
| 4,842,332 A | | 6/1989 | Conner, Jr. et al. |
| 4,853,069 A | | 8/1989 | Williams et al. |
| 4,910,886 A | | 3/1990 | Sullivan et al. |
| 4,952,439 A | | 8/1990 | Hanson |
| 4,956,932 A | | 9/1990 | Cupp |
| 4,998,367 A | | 3/1991 | Leibowitz |
| 5,098,421 A | | 3/1992 | Zook |
| 5,108,076 A | | 4/1992 | Chiarella |
| 5,112,543 A | | 5/1992 | Thary |
| 5,143,390 A | | 9/1992 | Goldsmith |
| 5,144,708 A | | 9/1992 | Pekar |
| 5,147,589 A | | 9/1992 | Chang et al. |
| 5,163,646 A | | 11/1992 | Engelhardt |
| 5,203,607 A | | 4/1993 | Landi |
| 5,215,699 A | | 6/1993 | Lieberman |
| 5,233,845 A | | 8/1993 | D'Andrade |
| 5,238,244 A | | 8/1993 | Cotter et al. |
| 5,267,487 A | | 12/1993 | Falco et al. |
| 5,280,993 A | | 1/1994 | Hsh |
| 5,282,326 A | | 2/1994 | Schroer, Jr. et al. |
| 5,318,344 A | | 6/1994 | Wang |
| 5,330,249 A | | 7/1994 | Weber et al. |
| 5,335,382 A | | 8/1994 | Huang |
| 5,356,099 A | | 10/1994 | Sereboff |
| 5,360,653 A | * | 11/1994 | Ackley ................... 428/71 |
| 5,390,467 A | | 2/1995 | Shuert |
| 5,409,648 A | | 4/1995 | Reidel |
| 5,419,612 A | | 5/1995 | Rassekhi |
| 5,419,730 A | | 5/1995 | Diresta et al. |
| 5,420,381 A | | 5/1995 | Gardner, Jr. et al. |
| 5,435,508 A | | 7/1995 | Deuitch et al. |
| 5,445,349 A | | 8/1995 | Hart |
| 5,476,491 A | | 12/1995 | Mayn |
| 5,547,154 A | | 8/1996 | Kirchhoff et al. |
| 5,551,173 A | | 9/1996 | Chambers |
| 5,562,147 A | | 10/1996 | Bortoloni |
| 5,568,907 A | | 10/1996 | Wolfe et al. |
| 5,572,804 A | | 11/1996 | Skaja et al. |
| 5,601,264 A | | 2/1997 | Peart |
| 5,634,685 A | | 6/1997 | Herring |
| 5,701,623 A | | 12/1997 | May |
| 5,704,905 A | | 1/1998 | Jensen et al. |
| 5,709,870 A | | 1/1998 | Yoshimura et al. |
| 5,720,518 A | | 2/1998 | Harrison |
| 5,766,704 A | | 6/1998 | Allen et al. |
| 5,829,073 A | | 11/1998 | Lee |
| 5,837,314 A | | 11/1998 | Beaton et al. |
| 5,846,063 A | | 12/1998 | Lakic |
| 5,865,180 A | | 2/1999 | Sigfrid |
| 5,904,396 A | | 5/1999 | Yates |
| 5,921,840 A | | 7/1999 | Diresta et al. |
| 5,932,046 A | | 8/1999 | Yates |
| 5,938,277 A | | 8/1999 | Rioux et al. |
| 5,939,157 A | | 8/1999 | Allen et al. |
| 5,975,629 A | | 11/1999 | Lorbiecki |
| 5,980,143 A | | 11/1999 | Bayer et al. |
| 6,007,149 A | | 12/1999 | Yates |
| 6,012,772 A | | 1/2000 | Conde et al. |
| 6,012,997 A | | 1/2000 | Mason |
| 6,029,962 A | | 2/2000 | Shorten et al. |
| 6,030,035 A | | 2/2000 | Yates |
| 6,076,784 A | | 6/2000 | Selker |
| 6,093,468 A | | 7/2000 | Toms et al. |
| 6,108,869 A | | 8/2000 | Meessmann et al. |
| 6,135,550 A | | 10/2000 | Tucho |
| 6,153,277 A | | 11/2000 | Chang |
| 6,171,091 B1 | | 1/2001 | Bettencourt |
| 6,199,304 B1 | | 3/2001 | Ludemann |
| 6,305,115 B1 | | 10/2001 | Cook |
| 6,305,743 B1 | | 10/2001 | Wheeler |
| 6,311,423 B1 | | 11/2001 | Graham |
| 6,324,703 B1 | | 12/2001 | Chen |

(56) References Cited

U.S. PATENT DOCUMENTS

| | | |
|---|---|---|
| 6,355,343 B1 | 3/2002 | Glassock |
| 6,390,548 B1 | 5/2002 | Cole |
| 6,422,647 B1 | 7/2002 | Turudich |
| 6,425,194 B1 | 7/2002 | Brie |
| 6,445,378 B1 | 9/2002 | Flagg |
| 6,450,906 B1 | 9/2002 | Touhey et al. |
| 6,467,212 B1 | 10/2002 | Apel |
| 6,499,703 B2 | 12/2002 | Chou |
| 6,546,583 B1 | 4/2003 | Röhrig |
| 6,588,023 B1 | 7/2003 | Wright |
| 6,594,935 B2 | 7/2003 | Beretta |
| 6,601,272 B2 | 8/2003 | Stvartak et al. |
| 6,620,495 B1 | 9/2003 | Kobayashi et al. |
| 6,631,568 B2 | 10/2003 | Howlett et al. |
| 6,643,875 B2 | 11/2003 | Boso et al. |
| 6,698,510 B2 | 3/2004 | Serra et al. |
| 6,705,026 B1 | 3/2004 | Arbour |
| 6,726,791 B1 | 4/2004 | Oelund et al. |
| 6,797,765 B2 | 9/2004 | Pearce |
| 6,802,140 B2 | 10/2004 | Aslanides |
| 6,834,456 B2 | 12/2004 | Murello |
| 6,880,269 B2 | 4/2005 | Falone et al. |
| 6,893,366 B2 | 5/2005 | Falone et al. |
| 6,922,862 B1 | 8/2005 | Thompson |
| 6,944,974 B2 | 9/2005 | Falone et al. |
| 6,991,691 B2 | 1/2006 | Yoon |
| 7,037,571 B2 | 5/2006 | Fish et al. |
| 7,048,879 B2 | 5/2006 | Kobayashi et al. |
| 7,114,783 B2 | 10/2006 | Warren et al. |
| 7,159,342 B2 | 1/2007 | Grisoni et al. |
| 7,183,523 B2 | 2/2007 | Lu |
| 7,261,525 B2 | 8/2007 | Pekar |
| 7,264,533 B2 | 9/2007 | Chan et al. |
| 7,424,760 B2 | 9/2008 | Chaffee |
| 7,448,676 B2 | 11/2008 | Wyner et al. |
| 7,827,704 B2 | 11/2010 | Fox et al. |
| 2001/0001351 A1 | 5/2001 | Dieckhaus |
| 2001/0055684 A1 | 12/2001 | Davis et al. |
| 2002/0030295 A1 | 3/2002 | De Winter et al. |
| 2002/0064641 A1* | 5/2002 | Kobayashi et al. ........ 428/304.4 |
| 2002/0095107 A1 | 7/2002 | Martin |
| 2002/0178621 A1 | 12/2002 | Darby |
| 2002/0192452 A1 | 12/2002 | Harrison et al. |
| 2003/0044313 A1 | 3/2003 | Lee |
| 2003/0070259 A1 | 4/2003 | Brown et al. |
| 2003/0070321 A1 | 4/2003 | Davis et al. |
| 2003/0080458 A1 | 5/2003 | Heilig et al. |
| 2003/0106132 A1 | 6/2003 | Terris et al. |
| 2003/0116883 A1 | 6/2003 | Thiessen |
| 2003/0132359 A1 | 7/2003 | Brophy |
| 2003/0135943 A1 | 7/2003 | Meyer et al. |
| 2003/0136025 A1 | 7/2003 | Galbraith et al. |
| 2003/0154567 A1 | 8/2003 | Drossler et al. |
| 2003/0161999 A1 | 8/2003 | Kannankeril et al. |
| 2003/0194526 A1 | 10/2003 | Vesley et al. |
| 2004/0048688 A1 | 3/2004 | Hogge et al. |
| 2004/0078998 A1 | 4/2004 | Davis et al. |
| 2004/0089965 A1 | 5/2004 | Malfliet et al. |
| 2004/0134098 A1 | 7/2004 | Beck |
| 2004/0144011 A1 | 7/2004 | Vignaroli et al. |
| 2004/0154133 A1 | 8/2004 | Polzin et al. |
| 2004/0191301 A1 | 9/2004 | Van Duren |
| 2004/0209059 A1 | 10/2004 | Foss |
| 2004/0247912 A1 | 12/2004 | Kim |
| 2005/0008867 A1 | 1/2005 | LaBatt |
| 2005/0038368 A1 | 2/2005 | Richter et al. |
| 2005/0101693 A1 | 5/2005 | Arbogast et al. |
| 2005/0126038 A1 | 6/2005 | Skaja et al. |
| 2005/0210710 A1 | 9/2005 | Chen |
| 2005/0218555 A1 | 10/2005 | De Winter et al. |
| 2005/0241186 A1 | 11/2005 | Mulligan et al. |
| 2005/0287342 A1 | 12/2005 | Miyazaki et al. |
| 2005/0287346 A1 | 12/2005 | Miyazaki et al. |
| 2006/0010608 A1 | 1/2006 | DeFranks et al. |
| 2006/0075658 A1 | 4/2006 | Mitchell |
| 2006/0168710 A1 | 8/2006 | Vito et al. |
| 2006/0182787 A1 | 8/2006 | Jaenichen et al. |
| 2006/0210773 A1 | 9/2006 | Kannankeril |
| 2006/0226578 A1 | 10/2006 | Farnworth et al. |
| 2006/0230643 A1 | 10/2006 | Affleck |
| 2006/0254088 A1 | 11/2006 | McCormick |
| 2006/0277788 A1 | 12/2006 | Fujii |
| 2006/0277801 A1 | 12/2006 | Schwarze et al. |
| 2006/0277950 A1 | 12/2006 | Rock |
| 2007/0033834 A1 | 2/2007 | Cheskin et al. |
| 2007/0061978 A1 | 3/2007 | Losio |
| 2007/0072712 A1 | 3/2007 | Chernick et al. |
| 2007/0113317 A1 | 5/2007 | Garneau |
| 2007/0199155 A1 | 8/2007 | Thygsen |
| 2007/0226911 A1 | 10/2007 | Gladney et al. |
| 2007/0261274 A1 | 11/2007 | Fox et al. |
| 2008/0010861 A1 | 1/2008 | Kosmas |
| 2008/0034614 A1 | 2/2008 | Fox et al. |
| 2008/0222918 A1 | 9/2008 | Hesse |
| 2008/0299163 A1 | 12/2008 | Haskin et al. |
| 2009/0029147 A1 | 1/2009 | Tang et al. |
| 2009/0090028 A1 | 4/2009 | Moramarco et al. |
| 2009/0255625 A1 | 10/2009 | Fox et al. |
| 2010/0005595 A1 | 1/2010 | Gladney et al. |
| 2010/0159192 A1 | 6/2010 | Cotton |

FOREIGN PATENT DOCUMENTS

| | | |
|---|---|---|
| WO | WO2004/007166 | 1/2004 |
| WO | WO2005/004658 | 1/2005 |
| WO | WO2005004936 | 1/2005 |
| WO | WO2007/092091 | 8/2007 |
| WO | WO2010/110804 | 9/2010 |

OTHER PUBLICATIONS

Teknor Apex "Monprene", www.teknorapex.com.

Electronic Products, "Gap-filler Pad Improves Compressiblity", www.electronicproducts.com.

U.S. Appl. No. 11/644,266, Methods of Making Polymeric Articles and Polymeric Articles Formed Thereby, Fox et al., filed Dec. 23, 2006.

U.S. Appl. No. 12/904,717, Methods of Making Polymeric Articles and Polymeric Articles Formed Thereby, Fox et al., filed Oct. 14, 2010.

U.S. Appl. No. 12/939,048, Methods of Making Polymeric Articles and Polymeric Articles Formed Thereby, Fox et al., filed Nov. 3, 2010.

U.S. Appl. No. 12/102,859, Impact and Vibration Absorbing Body—Contacting Medallions, Methods of Using and Methods of Making, Wyner et al., filed Apr. 14, 2008.

U.S. Appl. No. 13/155,664, Cushioning Medallions, Methods of Making and Methods of Using, Wyner et al., filed Jun. 8, 2011.

U.S. Appl. No. 12/325,725, Composite Material, Methods of Making and Articles Formed Thereby, Fox et al., filed Dec. 1, 2008.

U.S. Appl. No. 13/008,471, Improved Molding System, Method and Articles Formed Thereby, Fox et al., filed Jan. 18, 2011.

U.S. Appl. No. 13/169,986, Methods of Making Polymeric Articles and Polymeric Articles Formed Thereby, Fox et al., filed Jun. 27, 2011.

U.S. Appl. No. 13/005,893, Responsive Insoles, Fox et al., filed Jan. 13, 2011.

U.S. Appl. No. 61/456,698, Unibody Cable and Method of Using, Fox, filed Nov. 10, 2010.

U.S. Appl. No. 61/520,385, Cushioning articles and methods of making, LaFlamme, filed Jun. 9, 2011.

* cited by examiner

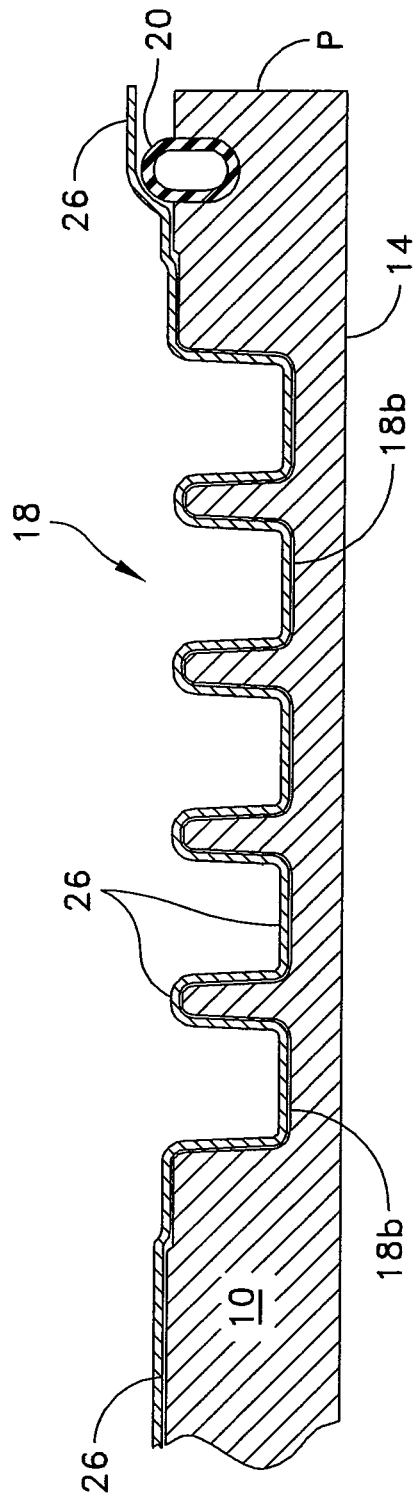
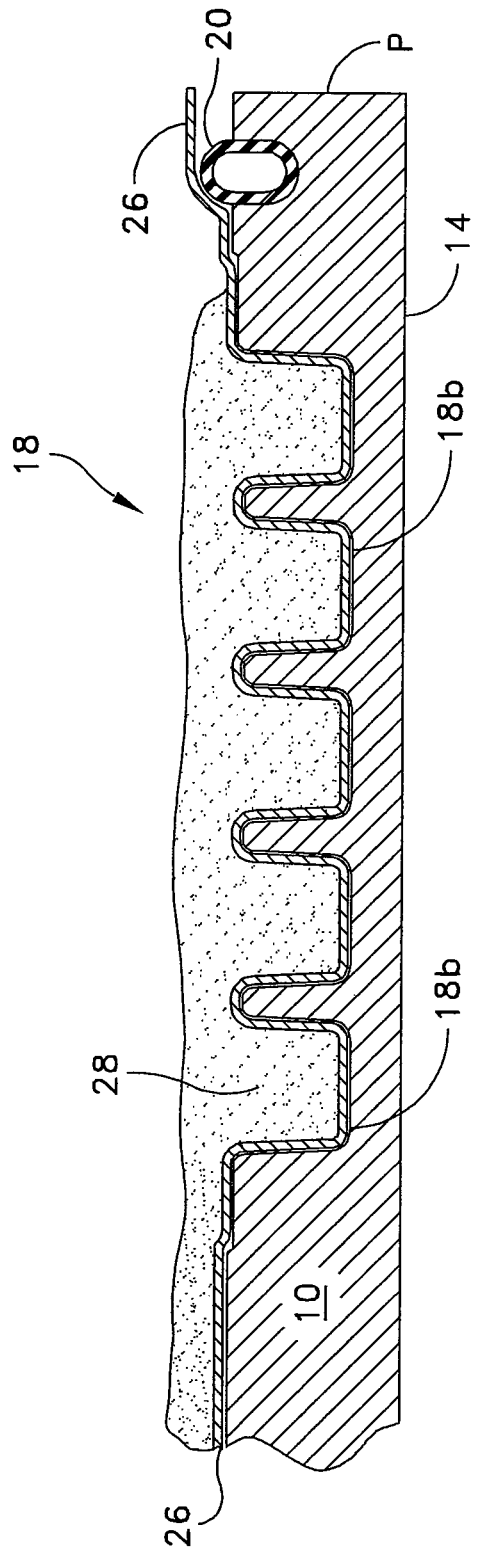

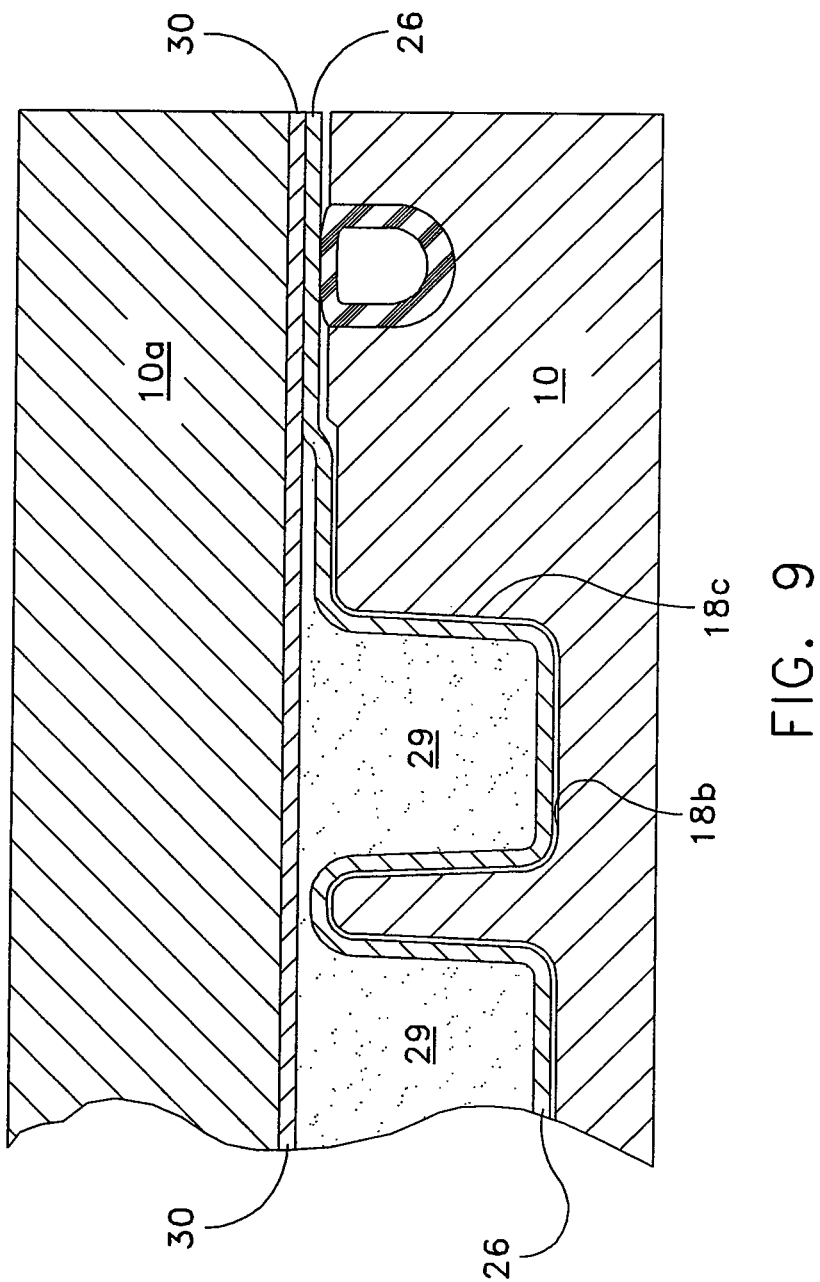

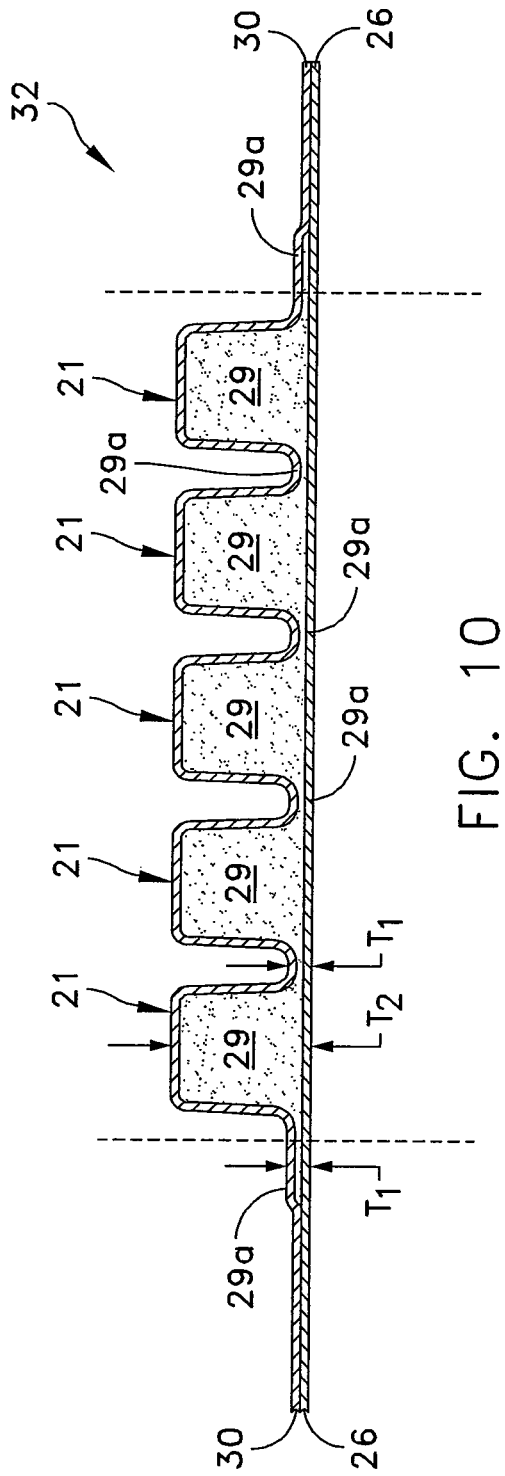
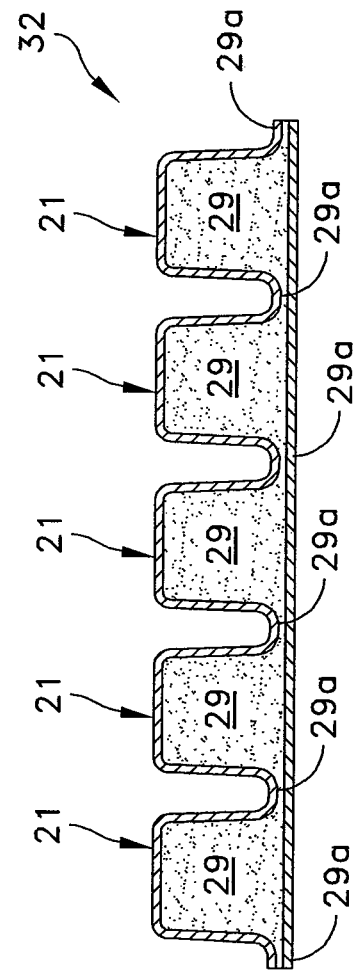

DEEP DRAW METHOD OF MAKING IMPACT AND VIBRATION ABSORBING ARTICLES AND THE ARTICLES FORMED THEREBY

RELATED CASES

Priority is claimed herein to U.S. Provisional Patent Application No. 61/044,859, which was filed on Apr. 14, 2008, and which is incorporated herein by reference in its entirety.

TECHNICAL FIELD

The present disclosure relates to methods of making polymeric articles and the articles made thereby and, in particular, to methods of making polymeric articles with improved cushioning characteristics and the articles made thereby.

BACKGROUND

Many different types of products benefit from the inclusion of a material that provides cushioning for, among other things, impact and vibration dampening, resistance to compression, deflection, friction reduction, and the like. For example, many frequently used objects comprise materials that are hard to the human touch and/or result in friction when disposed against a human body, especially in repetitive motions. It is generally thought desirable to make the body contacting regions of such objects as soft as possible in order to make their use more comfortable for a user e.g., by reducing pressure and/or friction.

Many attempts have been made to make such objects or the body contacting regions of such objects more comfortable for a user. One common type of cushioning material that is presently used in a wide variety of applications is open cell foam. The open cells of such foams can trap debris and moisture, thereby supporting the growth of microorganisms such as bacteria and fungi. Therefore, although open cell foams are capable of providing sufficient cushioning for many applications, the tendency to support the growth of bacteria and fungi make it less desirable for body-contacting applications such as footwear, sports protective padding, helmet linings, medical pads and braces, seating, and the like. In addition, depending upon the application, it may be necessary to use relatively thick and/or dense open cell foams in order to achieve the desired level of cushioning. As the thickness and/or density of the foam increases, so does the weight, thereby further limiting the applications for open cell foam as a cushioning material. In addition, for objects with non-planar and/or complex shapes, it can be difficult to tailor the shape of the cushioning material to conform to the shape of the object.

A need exists in the art for improved impact and vibration absorbing articles and methods of making.

SUMMARY

Disclosed herein, in one embodiment, is a cushioning member comprising a multilayer material comprising a barrier layer, a polymeric material layer disposed adjacent to the barrier layer, and a stabilization layer disposed adjacent to and opposite the barrier layer. A plurality of pillars is disposed in the multilayer material. Each of the plurality of pillars comprises a thickness. A plurality of spacer regions is also disposed between the plurality of pillars. The plurality of spacer regions comprises a spacer region thickness. The pillar thickness is greater than the spacer region thickness.

Disclosed in another embodiment is a cushioning member, comprising a multilayer material comprising a barrier layer, a polymeric material layer disposed adjacent to the barrier layer, and a stabilization layer disposed adjacent to and opposite the barrier layer. A plurality of pillars is disposed in the multilayer material. Each of the plurality of pillars comprises a ratio of thickness to width of greater than or equal to about 0.125 to 1.

Disclosed herein in yet another embodiment is a method of molding a cushioning member, comprising disposing a barrier layer onto the upper surface of a first mold section, the barrier layer comprising a thermoplastic elastomeric (TPE) material having thickness of greater than or equal to about 0.004", drawing the barrier layer against the surface of the first mold section under the influence of a vacuum; dispensing a first portion of a polymeric material precursor onto the barrier layer; disposing a stabilizing layer over the precursor; disposed a second mold section over the stabilizing layer; and allowing the precursor to cure to form the cushioning member.

DRAWINGS

Advantages, novel features, and uses of the disclosure will become more apparent from the following detailed description of non-limiting embodiments of the disclosure when considered in conjunction with the accompanying drawings, which are schematic and which are not intended to be drawn to scale. In the figures, each identical or substantially similar component that is illustrated in various figures is typically represented by a single numeral or notation. For purposes of clarity, not every component is labeled in every figure, nor is every component of each embodiment of the disclosure shown where illustration is not necessary to allow those of ordinary skill in the art to understand the disclosure. In the drawings:

FIG. 3 is a cross-sectional schematic view of the mold shown in FIG. 2, showing the application of a barrier layer to the mold;

FIG. 4 is a cross-sectional schematic view of the mold shown in FIG. 3, shows the application of a precursor to the barrier layer;

FIG. 9 is an expanded view of a portion of the mold adjacent to the gasket, after closure and polymerization of the precursor;

FIG. 10 shows a cross-sectional side view of a portion of a sheet containing the interconnected innersoles, after removal from the mold and before die cutting along the phantom lines;

FIG. 11 shows a cross-sectional side view the innersole shown FIG. 10, after die cutting to remove the portions of material interconnecting the innersoles;

DETAILED DESCRIPTION

Figure 1:
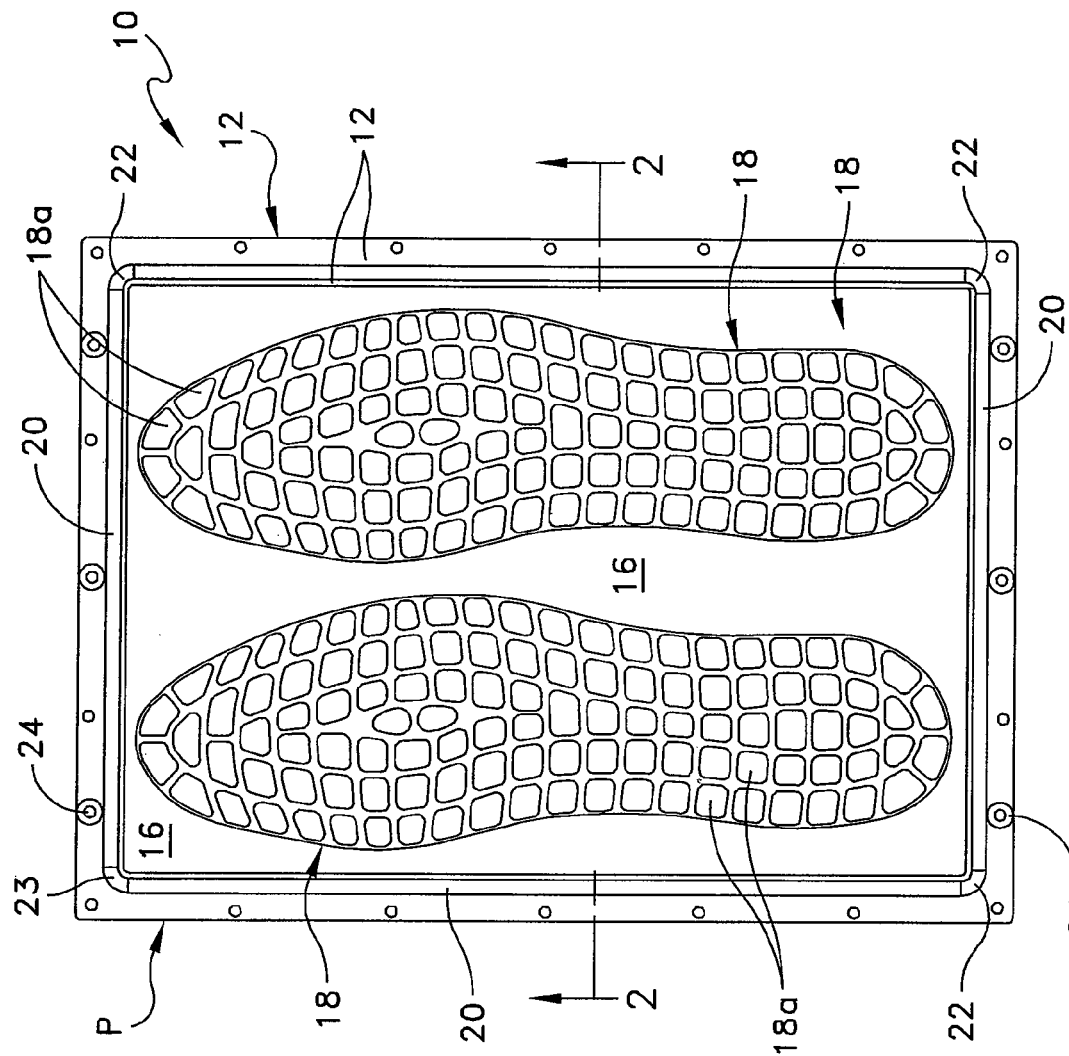
FIG. 1 is a perspective view an exemplary innersole mold that can be used in the method according to the present disclosure.

The present disclosure is directed to a relatively inexpensive method of molding cushioning materials comprising various degrees of hardness and the articles made thereby. The method unexpectedly allows the manufacture of materials that comprise a plurality of pillars with a thickness of up to about three (3) inches, or more, with spacer regions between the pillars as narrow as about two thousandths of an inch (0.002"), and spacer region thicknesses as low as about 0.005." It was previously thought that it would not be possible to achieve the foregoing relatively high thicknesses and relatively narrow spacing. The method can be used to form sheets of material that comprise the foregoing spaced apart pillars, which can be cut to conform to the shape of an existing product. Alternatively, the method can be used to mold a variety of commodity products, such as innersoles, that comprise the foregoing spaced apart pillars.

The size, shape and configuration of the pillars, the spacing between the pillars, and the material disposed in the pillars, all can be designed to provide vibration dampening, impact absorption, friction reduction, as well as cushioning, which can be varied as desired or necessary to achieve the desired product characteristics. In particular, the height or thickness of the pillars, in combination with substantially perpendicular sidewalls and an upper edge with a radius, provides pillars that are sufficiently pliable to be able to move in a variety of directions, resulting in substantial impact absorption and vibration dampening. Having spaces between pillars allows the pillars to move independently, and also allows the material to bend and flex in between the pillars, which may be desirable. Due to the spacing between the pillars, the material can also bend and flex between the pillars, allowing the spacing regions to function as hinges, and allowing the material to conform to non-planar surfaces (for example, the interior surface of a helmet). The desired amount of spacing can be determined by the amount of bending and/or flexing desired, as well as issues such as weight reduction, uniformity, and type of cushioning.

The pillars are capable of dispersing impact and vibration by flexing or moving from side to side. The amount of pillar flexing increases as the ratio of pillar height (or thickness) to pillar base width increases. As pillar height decreases in relation to pillar base width, the amount of flexing begins to more closely approximate that of a flat piece of material. Thus, a taller, narrow pillar is capable of a greater degree of flexing than a short, narrow pillar, made from the same materials. The ratio of the pillar height to the pillar base width can be from about 0.125:1 to about 8:1, more particularly from about 0.25:1 to about 6:1, and more particularly still from about 0.50:1 to about 2:1. It is possible for the pillars to flex below the foregoing ratio.

By providing the pillars with substantially perpendicular walls, it is possible to reduce the spacing between the pillars, while maintaining large height to base width ratios. For example, pillars with walls that slant outwardly have bases that are wider than pillars with perpendicular walls. Therefore, the height of pillars with outwardly slanting sidewalls would be greater than the height of those with perpendicular walls in order to achieve the same ratio of pillar height to pillar base width.

In other embodiments, the pillars can comprise sidewalls that are not substantially perpendicular, for example, having a width that is less then the width of the upper surface of the pillars, or that are indented or undercut. Pillars comprising such indentations or undercuts can be capable of even greater flex than pillars with perpendicular sidewalls.

The method involves molding a polymeric material to form the foregoing cushioning material with spaced apart pillars. It should be understood that the method is not limited to polymeric materials, and that materials other than polymeric materials can be molded with the method (e.g., composite materials, frothed foams, and the like). The method is particularly useful for molding relatively low viscosity or low durometer polymeric materials such as polymeric gel materials, in particular, viscoelastic polymeric materials (hereinafter referred to as "gel"). Gels having relatively low durometers, such as viscoelastic gels, can be extremely tacky, making them difficult or impossible to use in commercial process techniques such as injection molding, because the materials can adhere to the molds.

Figure 2:
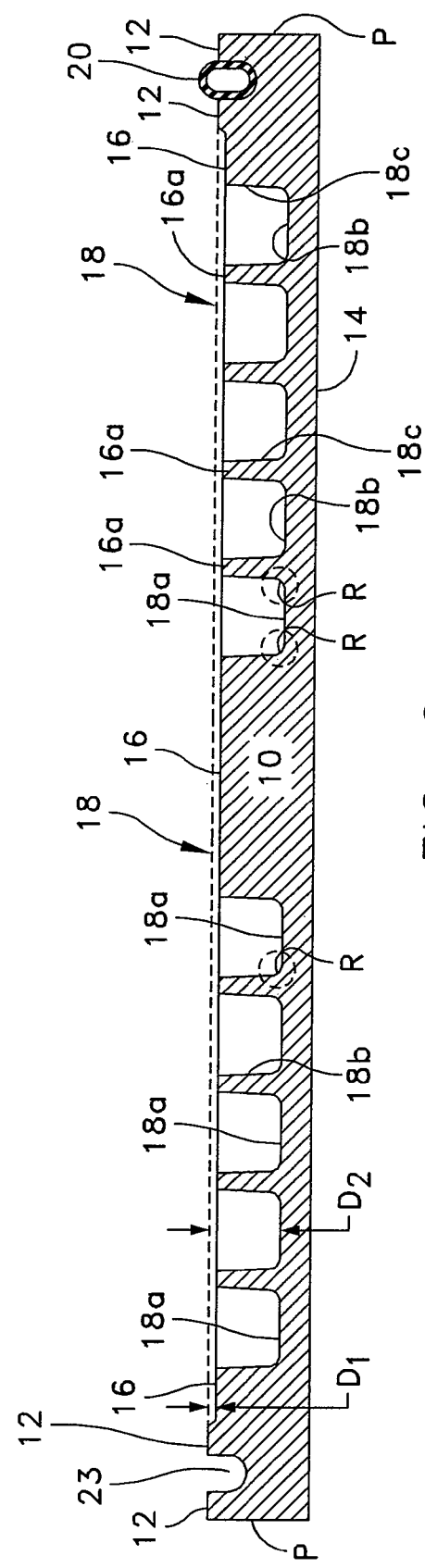
FIG. 2 is a cross-sectional schematic view of the mold shown in FIG. 1, through line 2-2, showing the two innersole molds in cross-section.

FIGS. 1-12, when taken together, illustrate an exemplary method for forming articles comprising the foregoing pillars according to the present disclosure. The present method involves selecting a suitable mold 10 for the desired product, as shown in FIGS. 1-2, which can comprise opposing upper and lower surfaces 12, 14. As shown, mold 10 can comprise a recessed region 16 defined in the upper surface 12 of the mold, which is recessed from the upper surface 12 by a depth "$D_1$". It should be understood that the terms "bottom" and "top," and/or "upper" and "lower" are used herein, unless otherwise noted, merely for convenience of description, and are not limited to any one position or spatial orientation. Also, it should be understood that the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. Further, unless defined otherwise, technical and scientific terms used herein have the same meaning as is commonly understood by one of skill in the art to which this disclosure belongs.

The present exemplary mold 10 comprises two (2) individual mold units 18 defined in the recessed region 16, each of which corresponds to the shape and size of the desired final molded product 19, which in this instance is an innersole. Although illustrated herein as an innersole for the sake of convenience, it should be understood that a variety of products can be molded using the present method. Each of the two (2) individual mold units 18 comprises a plurality of cells 18a spaced apart by regions 16a. Each cell 18a comprises a base 18b and a sidewall 18c extending substantially perpendicularly to the base 18b and the upper surface 12 of the mold 10, with a radiused edge "R" extending between the base 18b and sidewall 18c. The radiused edge "R" assists in providing impact and vibration dampening in the final product. Each of cells 18a is recessed from the upper surface 12 by a depth "$D_2$" which corresponds to the desired thickness of the final molded product 19. Cells 18a can comprise a variety of shapes, sizes and configurations, as desired or necessary.

Mold 10 also can comprise a gasket recess 23 disposed between the recessed region 16 and the perimeter "P" of the mold 10, in which a gasket 20 can be disposed. Alternatively, although not illustrated herein, it is possible for gasket 20 to be disposed directly on the upper surface 12 of the mold 10.

Gasket 20 can provide a seal sufficient to restrict the flow of polymer from the mold 10. Gasket 20 or mold 10 can comprise periodic gasket openings 22 (see FIG. 1) to allow entrapped air to flow out of the mold 10 during the molding process. Optionally, the mold 10 can comprise one or more registration guides 24 (e.g., pins, studs, and the like).

As shown in FIG. 3, after selection of a suitable mold 10, the method can comprise disposing a barrier layer 26 onto the mold 10. If desired, the mold and/or the barrier layer 26 can be pre-heated (e.g., using radiant heat), and a vacuum (e.g., about 5 to 15 psi) can be applied to draw the barrier layer 26 more closely against the mold surface, which can be desirable for pillars that are relatively thick or when articles require more definition (e.g., when they include features such as undercuts, and the like). The barrier layer can be preheated before or after disposing the barrier layer onto the mold 10, using a variety of techniques, including, but not limited to, radiant heat, thermal heat, etc. In addition, the heat and/or vacuum can be used throughout the molding process, if desired. The barrier layer 26 can be disposed onto the mold 10 as a sheet of material, or as a coating applied directly onto the mold. When applied as a sheet, then barrier layer 26 can be applied onto the mold, in physical contact with the gasket 20, such that it conforms to the contours of the molds 18 and individual cells 18a. When applied as a sheet, then the barrier layer 26 also can comprise registration guides (e.g., holes, perforations, etc., and the like) corresponding to the registration guides 24 in the mold 10, in order to aid in its alignment to the mold 10 and to subsequent layers. If the barrier layer 26 is not disposed as a sheet, then it can be disposed directly onto the upper surface 12 of mold 10. If desired, a release coating (not illustrated) may be used to assist in releasing the barrier layer 26 from the upper surface 12 of mold 10.

As shown in FIG. 4, after disposing the barrier layer 26 onto the upper surface 12 of the mold 10, a polymeric precursor material 28 can be dispensed onto the barrier layer 26. "Polymeric precursor," as used herein, means a polymeric precursor material that has not yet polymerized to form a polymer, including polymeric materials known in the art as "frothed foams." The precursor 28 can be disposed onto the barrier layer 26 using a variety of techniques such as, but not limited to, pouring, injecting, and/or the like.

Dispensing the precursor 28 can comprise pouring a sufficient amount (e.g., volume) of the precursor to fill each of the two (2) individual mold units 18, rather than filling a single mold unit 18, as in other processes such as injection molding. For example, other methods, such as injection molding, may involve dispensing the precursor 28 separately to each mold unit 18. Therefore, using the present mold, two (2) separate dispensing steps would be required. In contrast, the present method can comprise dispensing the precursor 28 once onto the barrier layer 26 (e.g., a single "pour"), and the single dispensation of precursor 28 can provide a sufficient amount of precursor 28 to form all of the mold units 18 in a single molding cycle. Dispensing the precursor 28 in bulk, rather than separately, can substantially reduce the manufacturing time of the present method in comparison to other methods.

Figure 5:
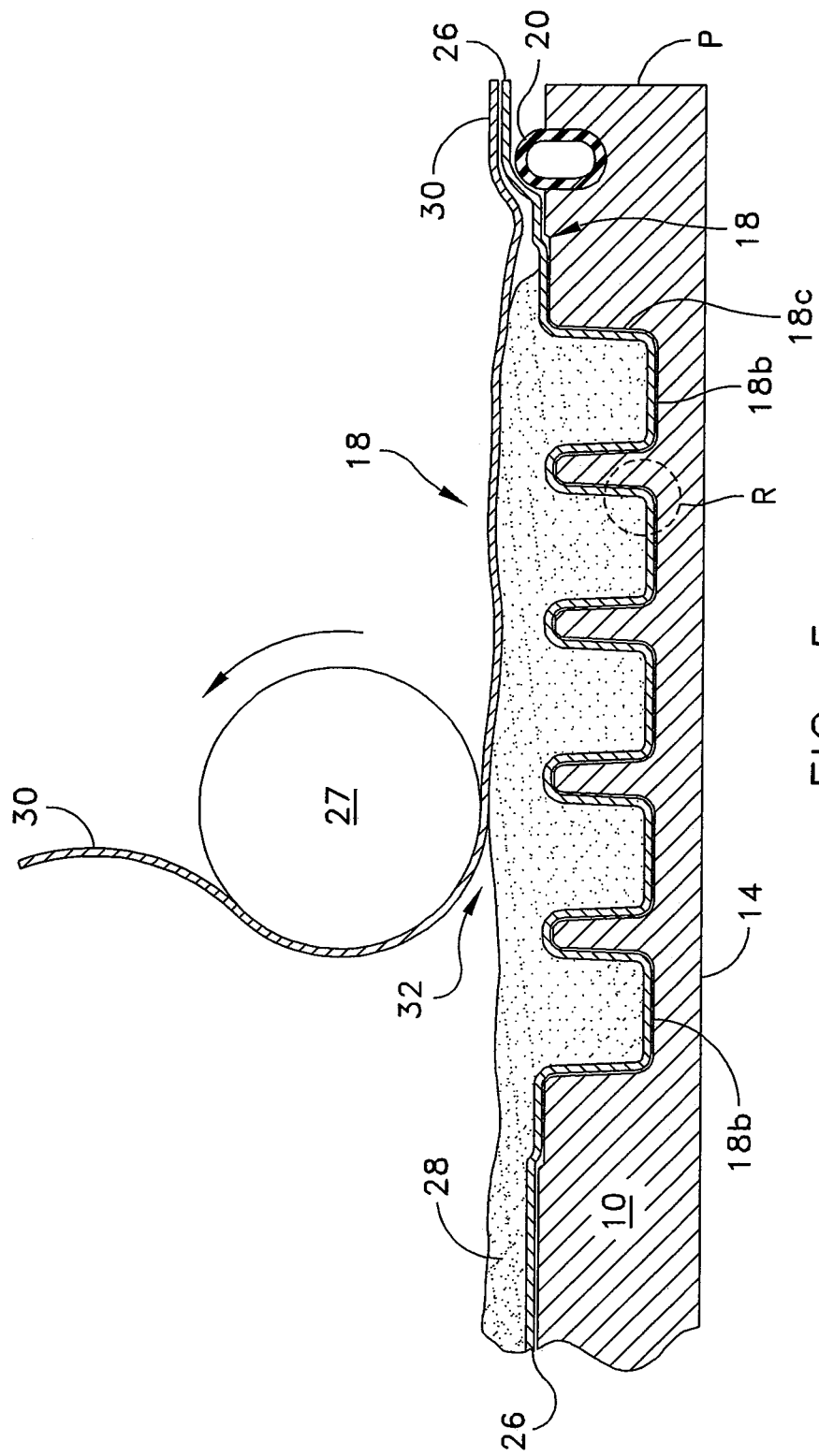
FIG. 5 is a cross-sectional schematic view of the mold shown in FIG. 4, showing the application of a stabilization layer to the precursor, and the method of advancing the stabilization layer over the precursor.
Figure 6:
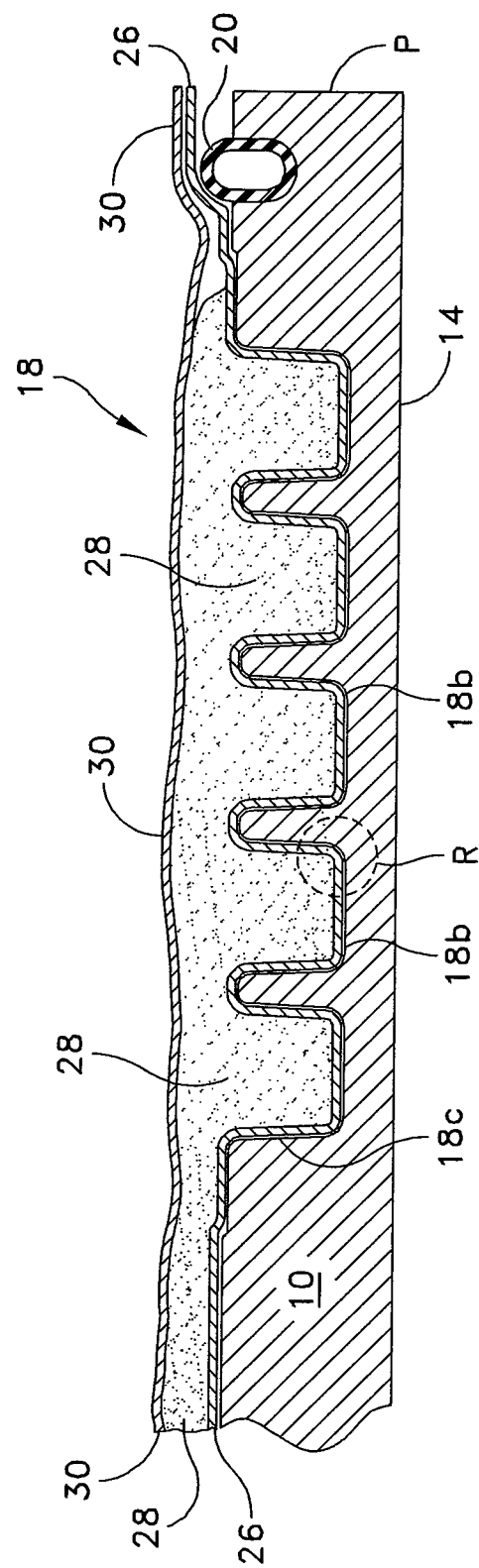
FIG. 6 shows the stabilization layer covering the precursor.

As shown in FIGS. 5 and 6, after dispensing the precursor 28 onto the barrier layer 26, a stabilizing layer 30 can be disposed over the precursor 28, for example, as a sheet. If mold 10 comprises registration guides 24, then the stabilizing layer 30 also can comprise corresponding registration guides (not illustrated) to aid in its alignment to the mold 10 and to any subsequent layers. Disposing the stabilizing layer 30 onto the precursor can comprise disposing a portion of the stabilizing layer 30 onto a portion of the precursor 28 such that an interface 32 exists between the precursor 28 and the stabilizing layer 30. Disposing the stabilizing layer 30 onto the precursor 28 can be performed manually, with a tool such as a roller 27, as shown in FIG. 5, or the process can be automated. The remaining portion of the stabilizing layer 30 can be advanced onto the remaining portion of the precursor 28 by applying pressure to the stabilizing layer 30 behind the interface 32, and advancing the interface 32 until the stabilizing layer 30 covers the entire precursor 28, as shown in FIG. 6. The application of pressure while advancing the stabilizing layer 30 substantially minimizes the formation of air bubbles between the precursor 28 and the stabilizing layer 30.

Figure 7:
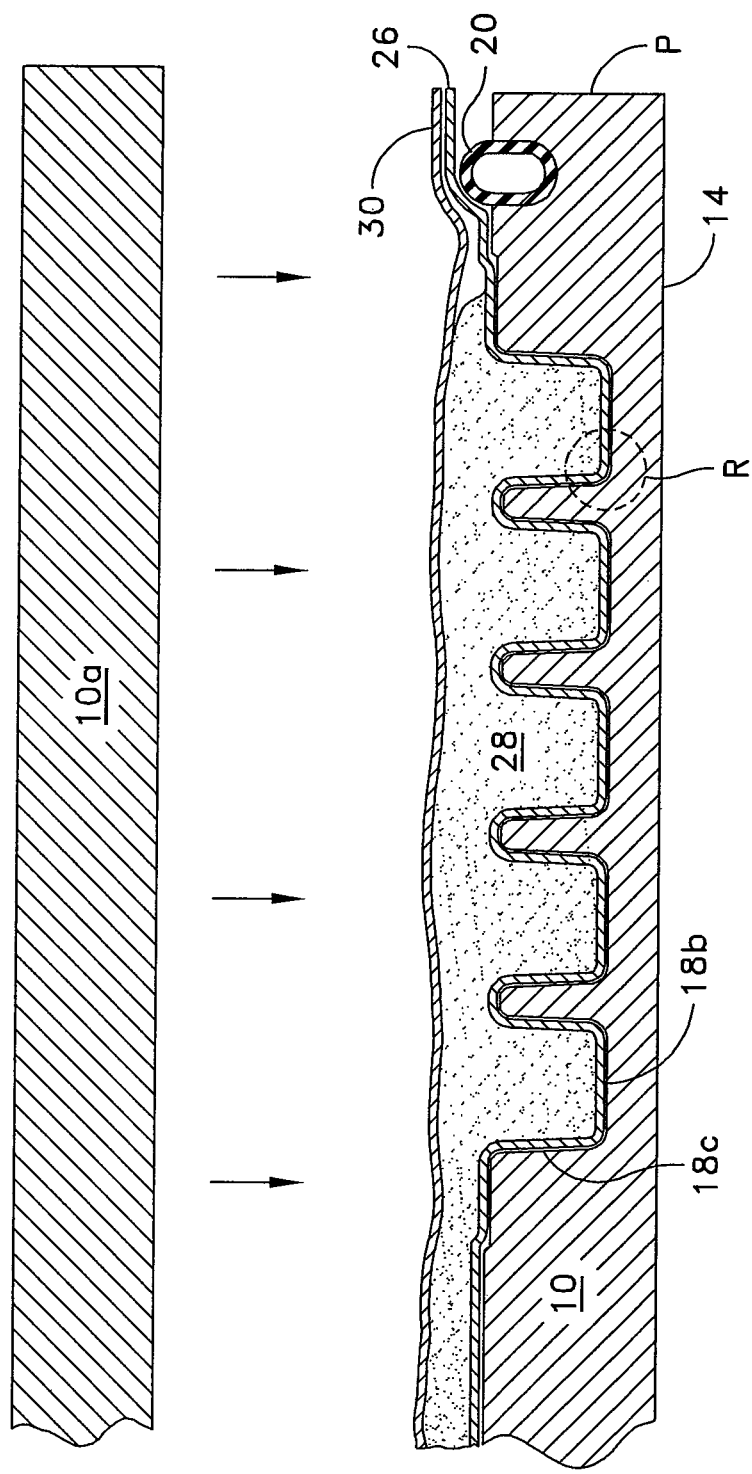
FIG. 7 shows the mold being closed.

As shown in FIG. 7, the mold 10 can be closed, for example by disposing a mold cover 10a over the stabilizing layer 30. When the mold 10 is closed, the precursor 28 can flow into all regions of the mold 10 defined by the gasket 20, including the individual molds 18 and cells 18a, and any entrapped air can flow out of the mold through gasket openings 22.

Figure 8:
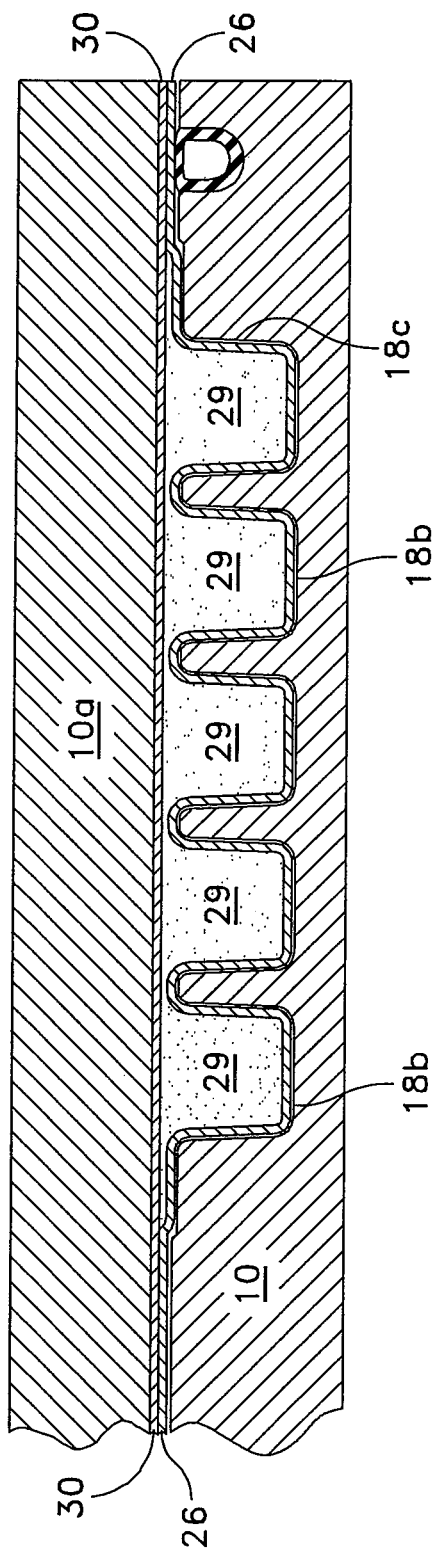
FIG. 8 shows the mold after closure and the polymerization of the precursor.

As shown in FIGS. 8 and 9, the precursor 28 can be allowed to polymerize to form a polymer 29 in the closed mold 10 for a predetermined period of time (e.g., 30 seconds to 5 minutes). The molding process can typically involve pressures of about 60 psi, but as noted above, if desired, additional pressure, heat, and/or a vacuum can be applied to the mold during processing for various reasons e.g., to increase the speed of processing, to improve the quality of the final material, to change the surface characteristics of the polymer, and/or the like. As a result, the overall processing time for producing a plurality of molded products 19 can be substantially reduced in comparison to other methods such as injection molding. In addition, because the time used to dispense the precursor 28 is reduced in comparison to other methods, it is possible to increase the speed of curing by varying a number of factors such as, for example, pressure, temperature, catalyst concentration (when used), and/or the like. The use of heat, pressure and/or vacuum during the molding process can be desirable when the articles to be formed require more definition such as undercuts, and the like. When vacuum forming or thermoforming, it can be desirable to utilize molds formed at least in part from a porous composite material, which allows the formation of intricate details and surface patterns in the molded article, and eliminates the necessity for vent holes in the mold. One example of such a porous composite material is breathable aluminum, which is available commercially under the brand name METAPOR™.

Figure 12:
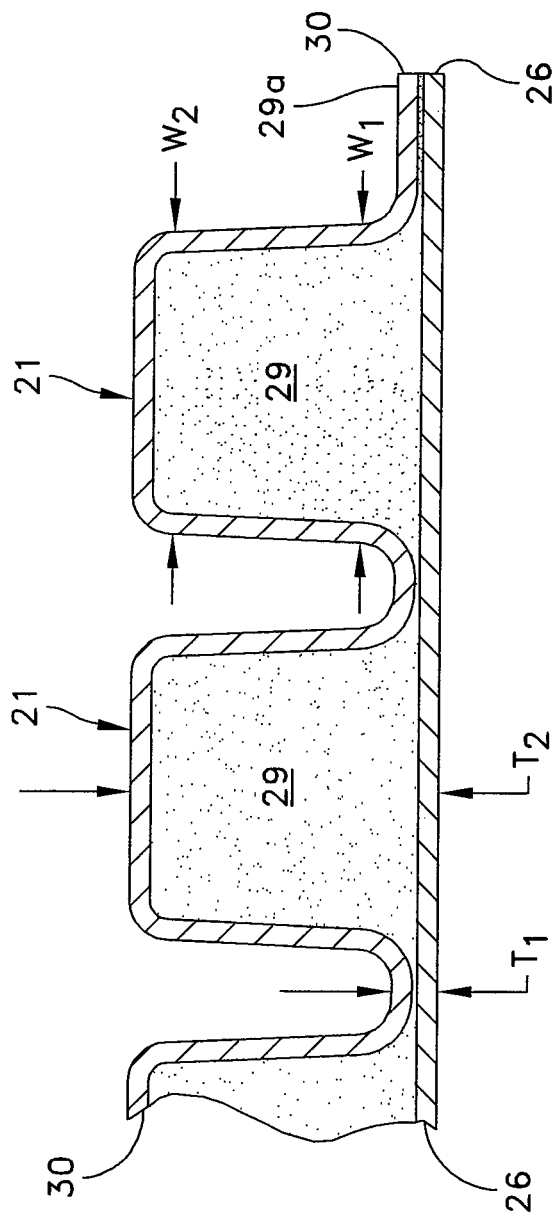
FIG. 12 is an expanded view of a portion of the innersole shown in FIG. 11, showing the edge portion of the innersole.

After curing, the mold 10 can be opened, and a sheet 32 (partial section shown) comprising the molded products 19 (which in this instance is an innersole) can be removed from the mold 10, as shown in FIG. 10. As shown, each of the molded products 19 comprises a plurality of pillars 21. As noted above, the size, shape and configuration of the pillars can be varied. The presence of the barrier layer 26 and the stabilization layer 30 can facilitate the handling of the sheet 32 because the polymer 29 is encapsulated by the layers 26, 30, which can be advantageous when the polymer 29 has adhesive properties (such as a polymeric gel material) that would otherwise cause it to adhere to surfaces such as the mold surface, a user's hand, and the like. The sheet 32 comprises a plurality of relatively thin regions 29a disposed between and interconnecting the pillars 21. The regions 29a of polymer can comprise a thickness "$T_1$" corresponding to the depth $D_1$ of the recessed region 16 of mold 10. In order to minimize waste, or when it is desirable for the thickness $T_1$ of regions 29a to be as thin as possible, the depth $D_1$ of the recessed region 16 can be selected to be as small as possible while still allowing unrestricted flow of the precursor 28 into the region defined by the gasket 20. Therefore, minimizing the thickness of the polymer in regions 29a can result in a thickness T₁ comprising slightly more than the combined thickness of the barrier layer and the stabilization layer, as shown in FIG. 12.

The molded products 19 can be separated from the sheet 32 and from each other by cutting (e.g., die cutting, and the like) through the barrier layer 26, polymer regions 29a and stabilization layer 30. The molded products 19 can be die cut between the polymer regions 29 and 29a and/or through the polymer region 29. When the polymer 29 has adhesive properties, then it may be desirable to die cut through a portion of the polymer regions 29 adjacent to the polymer region 29a, such that the sides of the molded units 19 comprise an exposed region of polymer. Otherwise, the exposed edges of regions 29a are sufficiently thin to avoid or minimize the edges of products 19 sticking to adjacent surfaces when not desired or necessary. During die cutting, the presence of the stabilization layer 30 prevents or minimizes the polymer 29 and barrier layer 26 from shrinking, thereby substantially maintaining the dimensions of the molded products 19 in comparison to the dimension of the mold units 18. Because shrinkage of the molded products 19 can be minimized, it may not be necessary to factor shrinkage into the design of the molds, as may be necessary with other methods.

Optionally, a layer 34 (see FIG. 16) of the same or different material can be disposed between any of the foregoing layers e.g., between the stabilization layer 30 and the polymer 29 and/or between the polymer 29 and the barrier layer 26. Also optionally, layer 34 can be disposed in the region 29 e.g., by disposing a first portion of the precursor 28 onto the barrier layer 26, disposing the layer 34 over the first portion of the precursor 28, and disposing a second portion of precursor 28 over the layer 34. Layer 34 can comprise a variety of synthetic and/or non-synthetic materials including, but not limited to, paper, fabric, plastic film, metal foil, and/or the like, as well as composites and/or combinations comprising at least one of the foregoing. When layer 34 comprises a fabric layer, the fabric can be knit, woven, non-woven, synthetic, non-synthetic, and combinations comprising at least one of the foregoing. Disposing a fabric layer as layer 34 can be advantageous because it can trap and disperse air bubbles that may otherwise form in or between the layers, resulting in a better appearance for the final molded products 19. Layer 34 also can comprise color, graphics and/or indicia, including text. The color, graphics and/or indicia disposed on layer 34 can be transmitted through other layers when they are formed from colorless and/or transparent materials, which can be desirable for aesthetic and costs reasons. In addition, if desired, layer 34 can be fluid-permeable. "Fluid-permeable," as used herein, means that the material from which layer 34 is formed is open to passage or entrance of a fluid material, such as the precursor.

Also optionally, layer 34 can be used in place of the stabilization layer 30. If layer 34 replaces stabilization layer 30, then it can be applied in the same manner described above with respect to stabilization layer 30.

In some instances, it may be desirable to be able to adhere the molded products 19 to various surfaces. Therefore, optionally, an adhesive (not illustrated) may be disposed on one or more surfaces of the final molded products 19. Also optionally, an adhesive can be disposed and/or on one or more surfaces of layers 26, 28, and 34. For example, with reference to FIG. 11, an adhesive can be disposed on surface 30b, and the adhesive can be supported by a release and/or support layer (not illustrated). Some possible adhesives can comprise pressure sensitive adhesives, thermoplastic adhesives, and the like, as well as combinations comprising at least one of the foregoing. Examples of suitable adhesives include a material available from 3M as product number 7026.

In some instances, the polymer 29 may comprise sufficient adhesive strength to be adhered to a surface in the absence of a separate adhesive. In such instances, it may be desirable that the stabilizing layer 30 can be capable of manual release from the polymer 29. Therefore, optionally, the stabilizing layer 30 can comprise a release coating (not illustrated) such as silicone, disposed on surface 30a, which can assist in the manual release of the stabilizing layer 30 from the polymer 29.

A variety of materials can be used in the foregoing methods to make the foregoing molded products 19. The barrier layer 26 can comprise any material capable of providing sufficient elasticity to prevent tearing and/or stretching when a force is applied thereto; sufficient structural integrity to be formed into predetermined shapes; and that is capable of withstanding the environment in which it is intended to be used, without substantial degradation. The barrier layer 26 also can be selected to facilitate the handling of the polymer layer, which can comprise adhesive characteristics in some instances. Therefore, after molding, the barrier layer 26 can be selected to comprise a relatively non-tacky surface and a relatively smooth feel to the human touch. Some possible materials for the barrier layer 26 include polyolefins, polystyrenes, PVC, latex rubber, and thermoplastic elastomers (TPEs), and/or the like, and combinations comprising at least one of the foregoing materials. Some possible TPE materials include polyurethane, silicone, and/or the like, and combinations comprising at least one of the foregoing materials. The barrier layer 26 can comprise an elongation of about 100 percent (%) to about 1500%, more particularly about 200% to about 1000%, and more particularly still about 300% to about 700%". It should be understood that the modifier "about" used in connection with a quantity is inclusive of the stated value and has the meaning dictated by the context (e.g., includes the degree of error associated with measurement of the particular quantity). Other possible materials for the barrier layer 26 include, but are not limited to, fabrics, paper, plastic (e.g., polyester, polyethylene, polyvinyl chloride (PVC), and the like) metal, metallized plastic, and/or the like, and combinations comprising at least one of the foregoing materials.

Barrier layer 26 can comprise any thickness capable of allowing the products to be molded without sticking to the mold. The thickness of the barrier layer 26 can be varied depending upon the application and the desired thickness for a particular application can be determined using routine experimentation by those of ordinary skill in the art. Barrier layer 26 can comprise a thickness ranging from about 0.2 milli-inch (hereinafter "mil") to about 60 mil, more particularly from about 0.5 mil to about 30 mil, and more particularly still from about 1.0 mil to about 15 mil. For example, in instances in which the hand-feel of the products is important, it has been found that this can be achieved with relatively thin barrier layers 26. Therefore, in such products it can be desirable to use the thinnest barrier layer possible without sacrificing durability. For example, for application in which a relatively thin barrier layer 26 is desirable, it can comprise a thickness ranging from about 0.2 milli-inch to about 6 ml, more particularly from about 0.5 mil to about 3 mil, and more particularly still from about 0.6 mil to about 2 mil. When the durometer of the polymerized layer 29 is such that it is tacky, the tacky material can be exposed if the barrier layer 26 is punctured, making the products difficult to handle. In such instances, it can be desirable to use a thicker barrier layer 26, which can provide increased durability in comparison to thinner barrier layers. For example, when the present materials are used in vibration dampening applications, it can be desirable for the thickness of the barrier layer 26 to be about 50 to about 60 mil. When the present products are formed using a thermoforming process, it can be desirable to use a barrier layer having a thickness of up to about 1/8 inch, and even thicker in some instances when desired or necessary. It has been found that it is possible to maintain very soft pliability for barrier layers having a thickness of as much as 6 mil or more by applying heat and/or a vacuum during the thermoforming process.

As noted above, barrier layer 26 can be applied as a sheet of material during the molding process. In the form of a sheet, and especially when the barrier layer is relatively thin, the barrier material can be very flexible and may wrinkle and/or fold very easily during handling. Therefore, the barrier layer 26 also can comprise a support layer (not illustrated), which assists in handling the material. If the barrier layer 26 comprises such a supporting layer, then the supporting layer can be disposed adjacent to the upper surface 12 of the mold 10, with the barrier layer material facing away from the upper surface 12, which can be removed prior to die cutting, if desired or necessary.

Also as noted above, if barrier layer 26 is not applied as a sheet, then it can be applied as a coating of material during or after the molding process. If applied after the molding process, then the barrier layer can be disposed onto the precursor 28 after formation of the molded units 18, for example by painting, spraying, brushing manually, and/or the like. When the barrier layer 26 is not disposed as a sheet or is not disposed as a coating during the molding process, and then the precursor 28 can be disposed directly onto the upper surface 12 of mold 10, which may require the use of a release agent on the upper surface 12.

The polymer 29, 29a can comprise any polymeric material comprising sufficient structural integrity to be formed into predetermined shapes, including foam polymeric materials and frothed foam polymeric materials; and that is capable of withstanding the environment in which it is intended to be used, without substantial degradation. The hardness of the material (e.g., the polymer materials) can be selected to provide articles and/or regions of articles with a predetermined hardness, which can be tailored for specific cushioning and/or wear resistance applications. The polymer 29, 29a can comprise a durometer ranging from about 30 Shore 000 to about 88 Shore D. The durometer of the polymer can be determined by those of ordinary skill in the art using tools such as durometers or penetrometers.

Examples of suitable polymeric materials include, but are not limited to, thermosetting polymeric materials, elastomeric polymeric materials, thermoplastic materials, including thermoplastic elastomeric materials, and combinations comprising at least one of the foregoing. Some possible polymeric materials include, but are not limited to, polyurethane, silicone, and/or the like, and combinations comprising at least one of the foregoing materials. Examples of other materials include, but are not limited to, composite materials, and the like. One suitable material is a polyurethane frothed foam that is commercially available under the name PORON®.

Formation of the precursor 28 can take place by a variety of methods known to those of skill in the art. For example, formation of a polyurethane gel can comprise reacting suitable pre-polymeric precursor materials e.g., reacting a polyol and an isocyanate in the presence of a catalyst.

In some instances, it can be desirable for the polymer to be sufficient softness and/or pliability to provide comfort against a body. In such instances, polymer can comprise a durometer ranging from about 0.01 Shore 00 to less than or equal to about 70 Shore A, more particularly less than 70 Shore 00, more particularly still less than 60 Shore 00.

In some embodiments, it can be desirable for the polymer to have sufficient adhesive strength to adhere to a selected surface (such as the inner surface of a shoe) which can eliminate the need for a separate adhesive to adhere the molded units to a desired surface. It is possible to vary the adhesive strength of the polymer by varying, for example, the durometer of the material used to form the layer. In such instances, the polymer can comprise, for example, a polymer having a durometer of about 30 Shore 000 to about 85 Shore 00. Gel materials in such relatively low durometer ranges can comprise a jelly-like consistency. One possible material having such adhesive characteristics is a polyurethane gel comprising a durometer in the range of about 50 Shore 00 to about 70 Shore 00, which can provide sufficient adhesive strength to adhere to a desired surface, such as the surface of an inner shoe, or a rigid plastic such a polypropylene.

Again, although illustrated herein as a polymer, other materials can be used to form layers and/or regions 29, 29a such as, for example, composite materials.

The polymer 29 and/or the barrier layer 26 can comprise one or more additives such as, but not limited to, modifiers, coloring agents, stabilizers, phase changing materials, ultraviolet inhibitors, and/or active agents as well as combinations comprising at least one of the foregoing. The concentration of the additive can be varied depending on the desired effectiveness of the agent.

One possible phase changing material can comprise phase changing microspheres (available under the product name Outlast), which contain materials that can change phases at near body temperature. As a result, heat energy can be stored in the barrier layer, resulting in a product that can feel cool or warm.

Suitable active agents can comprise tolnaftate, undecenoic acid, allylamines, chlorine, copper, baking soda, sodium omadine, zinc omadine, azoles, silver, and/or the like, and combinations comprising at least one of the foregoing. For example, silver can provide an antifungal/antibacterial effect. For purposes of economy and effectiveness, it has been found advantageous to include active agents, when used, in the barrier layer 26. Because the barrier layer 26 is relatively thin in comparison to the polymer 29, disposing such agents in the barrier layer 26 allows the use of reduced total amounts of the agents to achieve similar effective concentrations in comparison to thicker layers, thereby reducing costs associated with the additives. Also, disposing such agents in the barrier layer 26 ensures that the agents are disposed in the outermost layer of the article i.e., the body contacting regions, rather than in regions remote from the user, which can increase the effectiveness of the agents.

In some instances, it may be desirable to use colorless materials for each of the barrier, polymer and stabilization layers, which can be desirable for aesthetic reasons. In another embodiment, when layer 34 is included in the structure, and the layer includes color, graphics and/or indicia, it can also be desirable to use colorless and/or transparent materials because the color, graphics and/or indicia will be visible through the layers.

The stabilizing layer 30 can comprise a material that is capable of substantially minimizing shrinkage of the barrier layer 26, precursor 28 and/or the polymer 29 during and after processing; that can provide support for the polymer 29; and that is capable of facilitating handling of the polymer 29 and the barrier layer 26. The stabilizing layer 30 can comprise any material that is substantially inelastic in comparison to the polymer 29, in order to be capable of providing dimensional stability to the sheet 32 and/or to the molded products 19 during and after processing. Some possible materials for the stabilizing layer 30 include, but are not limited to, fabrics, paper, plastic (e.g., polyester, polyethylene, polyvinyl chloride (PVC), and the like) metal, metallized plastic, and/or the like, and combinations comprising at least one of the foregoing materials. The stabilization layer 30 can comprise any thickness desired for a particular application, which can be determined by those of ordinary skill in the art. For example, in some embodiments, stabilization layer 30 can comprise a thickness ranging from about 0.2 mil to about 10 mil, more particularly from about 0.5 mil to about 5 mil, and more particularly still from about 1 mil to about 2 mil. One possible material available in the foregoing thickness ranges is oriented polyester film, which is commercially available from a variety of sources and a under variety of different product names (e.g., MYLAR®). In other embodiments, stabilization layer 30 can comprise a thickness ranging from about 1 millimeters (mm) to about 8 mm, more particularly from about 2 mm to about 6 mm, and more particularly still from about 3 mm to about 4 mm. One possible material having a thickness in the foregoing range is a polyurethane foam that is commercially available under the name PORON®.

The foregoing methods and materials can facilitate the manufacture of polymeric articles and/or regions of articles, which can be desirable for aesthetics and/or to minimize wear and/or friction. The methods can be used to form polymeric articles and/or regions of articles, comprising any size, thickness or geometry. The size, thickness, geometry, softness, and adhesive strength of the articles and/or portions of the articles can be selected to optimize the conditions for which it is designed. Examples of articles in which the foregoing polymeric materials can be useful include, but are not limited to, handles for personal care objects such as hairbrushes, toothbrushes and razors; medical devices such as masks, crutches and casts; handles for household objects such as brooms; straps for luggage, backpacks, briefcases and purses; clothing such as cycling shorts, undergarments and shoes; utility objects such as mousepads, keyboard rests; handles and/or straps for consumer goods such as bottles and/or boxes, laundry detergent handles; sporting goods equipment and accessories such as racquet grips, bat handles, fishing rod grips, guns, and bicycle handlebar grips; and the like. In addition, the articles can comprise indicia such as labels with color, text and/or graphics, and the like.

Figure 13:
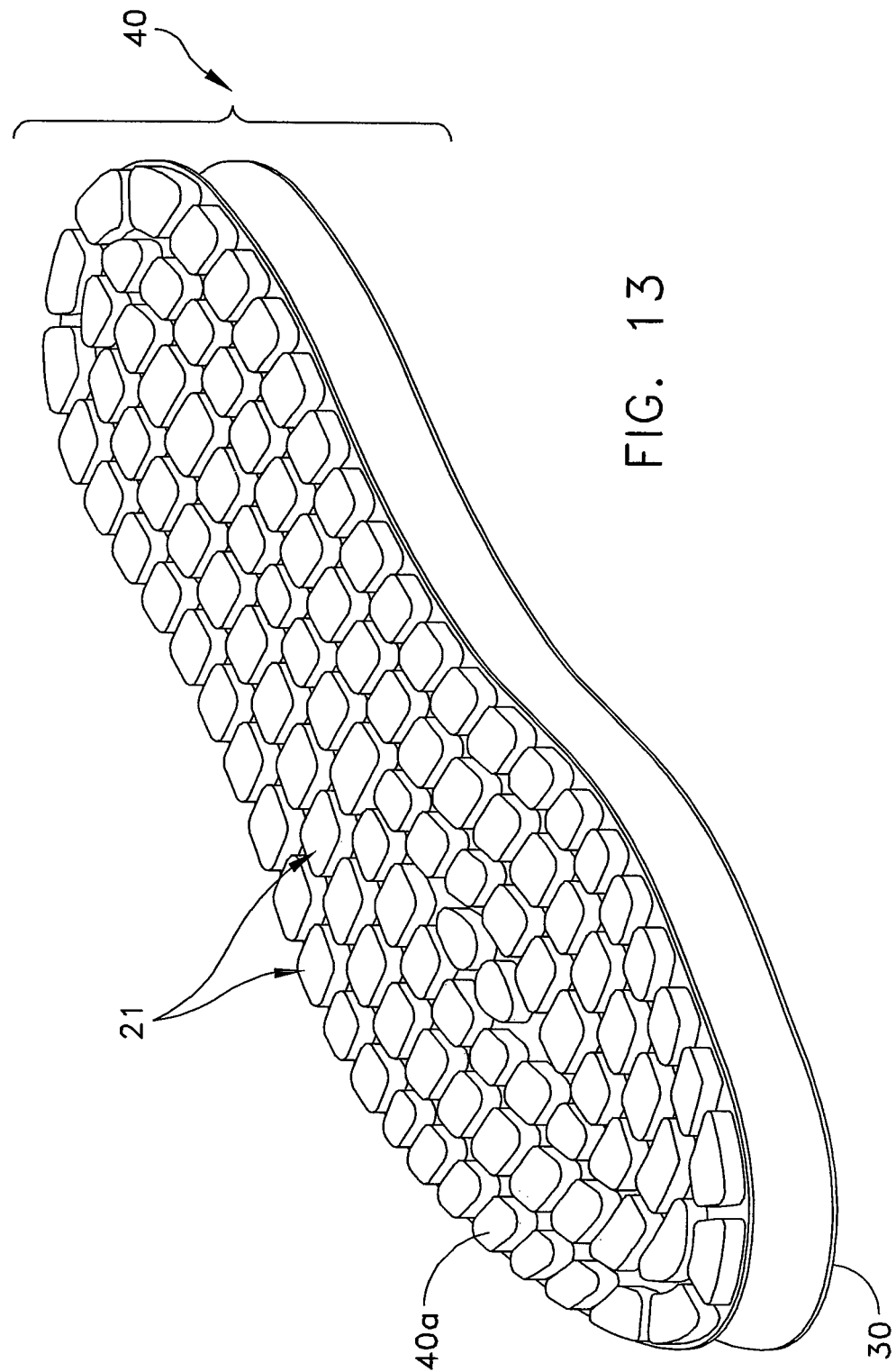
FIG. 13 is a top perspective view of the innersole of FIG. 12.
Figure 14:
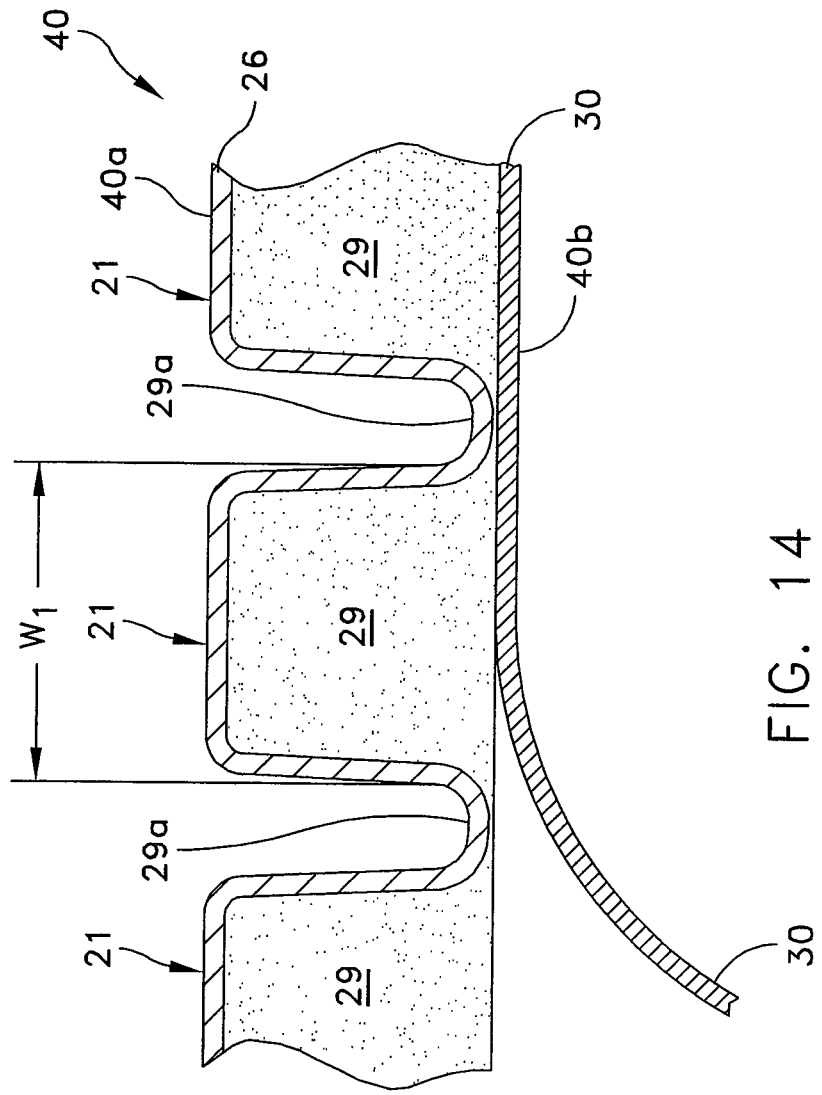
FIG. 14 is a cross-sectional side view of the innersole of FIG. 13, showing release of the stabilizing layer.

FIGS. 13-14, when taken together, show an exemplary innersole 40 which can be formed using the foregoing methods and materials. Innersole 40 can comprise opposing upper and lower surfaces 40a, 40b. In the present illustrative embodiment, innersole 40 can comprise a total thickness ranging from about 0.020" to about 1¼ inch, but it should be understood other thicknesses can be achieved with the present methods, which will depend upon the application. A barrier layer 26 can be disposed adjacent to a polymer layer 29, and a stabilizing layer 30 can be disposed on a side of the polymer layer 29 opposite the barrier layer 26. If desired, innersole 40 can comprise an active agent, such as an antifungal agent, disposed in the barrier layer 26. In one illustrative embodiment, the barrier layer 26 can comprise an active agent such as silver, to prevent and/or treat the condition of athlete's foot. One possible barrier layer 26 comprising such an active agent is Vacuflex 18411 AG, available from Omniflex, Inc.

In another embodiment, the polymer layer 29 can comprise an adhesive strength sufficient to allow it to adhere to a surface, such as the inner surface of a shoe. Thus, the stabilizing layer 30 can optionally comprise a release coating (not illustrated) such as silicone, disposed on surface 30a, which can assist in the manual release of the stabilizing layer 30 from the polymer 29, thereby exposing the polymer 29 in order to allow it to be adhered to a surface.

In another embodiment, an adhesive (not illustrated), such as a pressure sensitive adhesive, can be disposed on surface 40b of the stabilizing layer 30 to allow innersole 40 to be adhered to a surface, such as the inner surface of a shoe. Such an option may be useful, for example, if the stabilizing layer 30 does not comprise a release coating on surface 30a.

Figure 15:
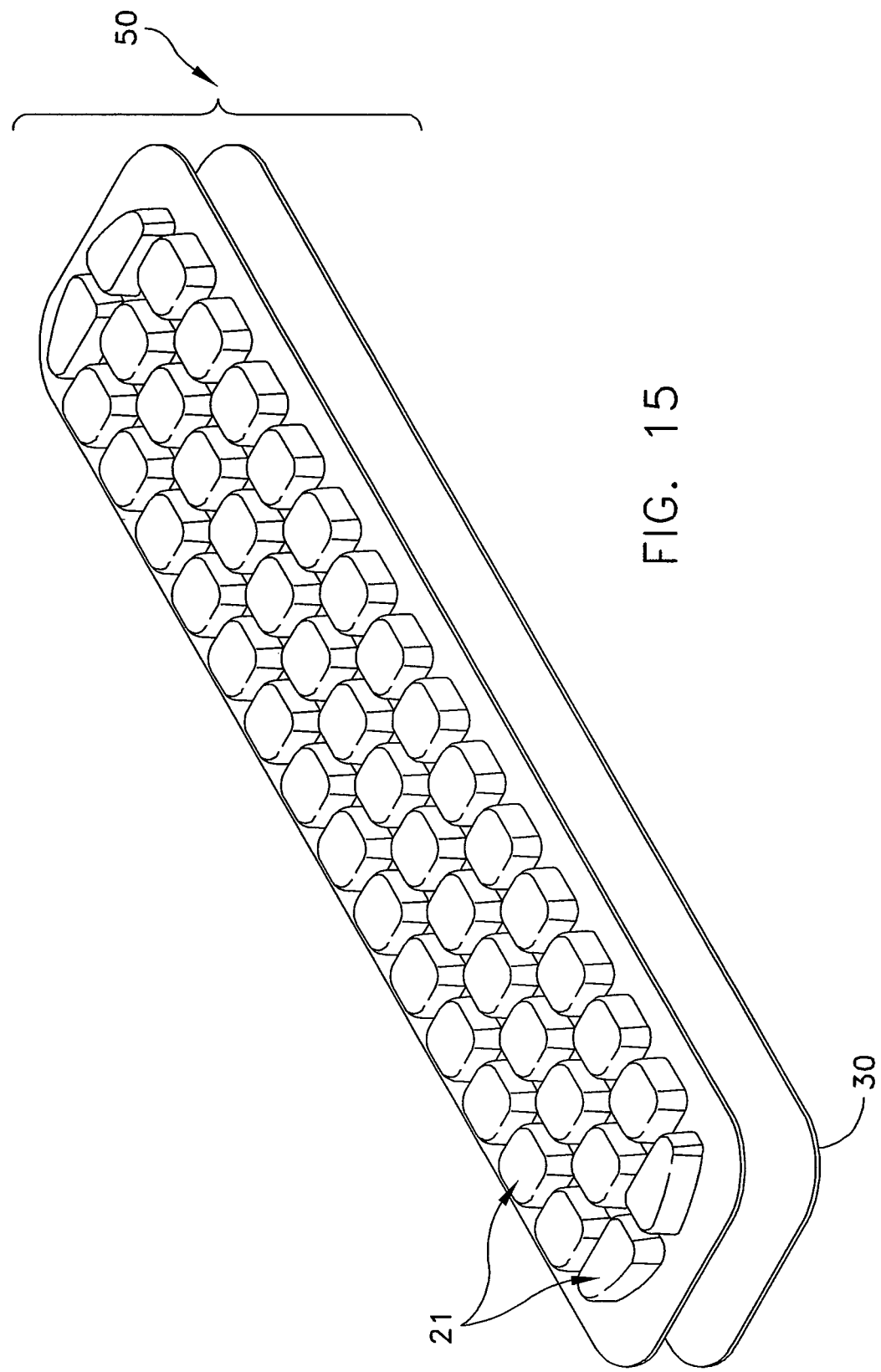
FIG. 15 is a top perspective view of a strap made according to the method of the disclosure.
Figure 16:
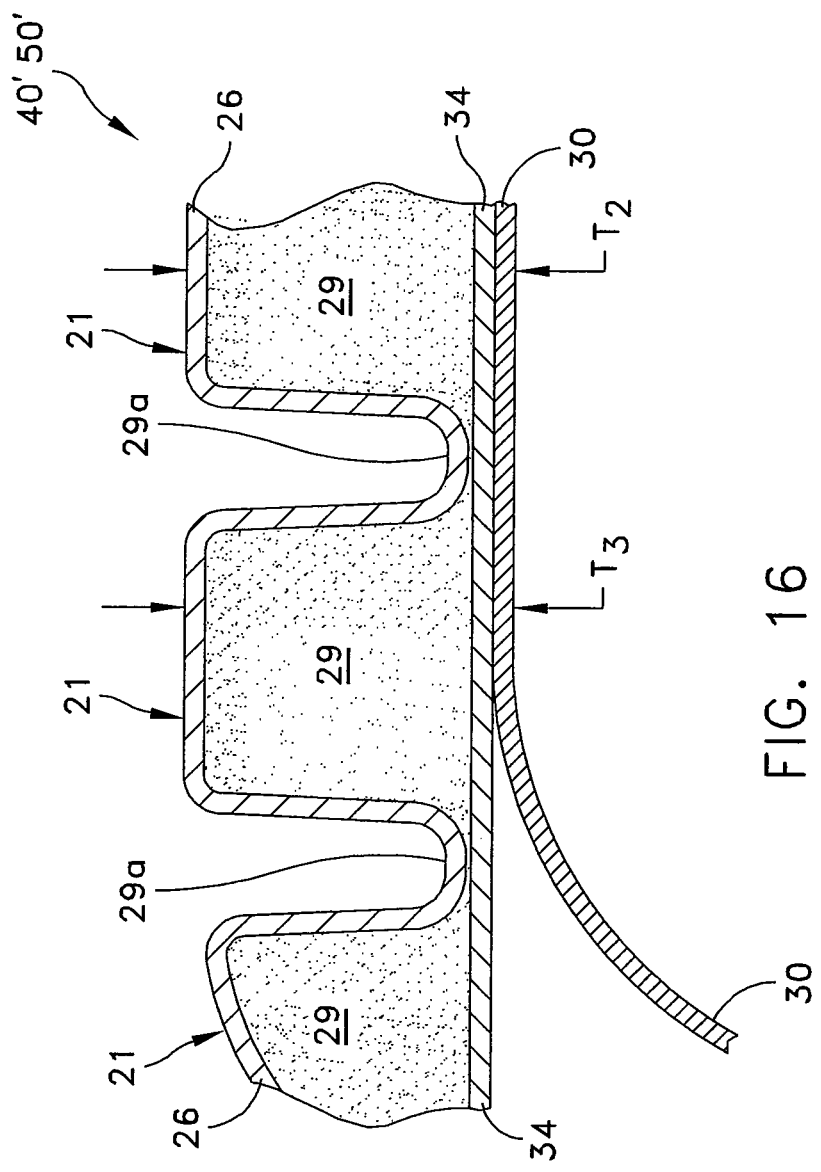
FIG. 16 is a cross-sectional side view of the innersole of FIG. 13, showing release of the stabilizing layer.

FIGS. 15-16 show an exemplary strap 50 which can be formed using the foregoing methods and materials. In the present illustrative embodiment, strap 50 can comprise a barrier layer 26 disposed adjacent to a first polymer layer 29, a fabric layer 34 disposed on a side of the polymer layer 29 opposite the barrier layer 26, stabilization layer 30 disposed adjacent to fabric layer 34.

As noted above, layer 34 can be at least partially fluid-permeable, which can allow penetration of the precursor through at least a portion of layer 34 (e.g., through the strands of a woven textile). Thus, during the molding process, when layer 34 is fluid-permeable, the precursor can flow at least partially penetrate through layer 34 or a portion of layer 34, and create a tacky, adhesive surface on the side of layer 34 opposite the polymer layer 29, which surface can be a continuous or discontinuous layer, depending on the amount of precursor that flows through layer 34. Thus, in the final product, layer 34 can be sandwiched between at least partially interconnected two gel layers. It should be understood that the degree of penetration of the gel into and/or through layer 34 depends on a variety of factors including, but not limited to, the type of material, the thickness of material, the degree to which the material is fluid-permeable (e.g., the size of any pores and/or openings in layer 34, and the like), the viscosity of the gel, the molding pressure and temperature, and the like. Thus, the thickness of layer 29a, and whether the layer is continuous or discontinuous depends on the foregoing as well.

As noted above, the adhesive strength of layer 29, 29a can vary, depending on a variety of factors. In one embodiment, if the polymer layer 29a has sufficient adhesive strength, it can be used to adhere the strap 50 directly to a surface, such as the inner surface of a shoulder bag (not illustrated), thereby eliminating a separate adhesive. In another embodiment, an adhesive (not illustrated) can be disposed between the polymer layer 29a and the stabilization layer 30, if desired. Strap 50 can be disposed in the shoe (not illustrated) by peeling back and removing the stabilization layer 30, exposing the adhesive polymer layer 29a, and adhering the polymer layer 29a to the strap 50. If desired, strap 50 can comprise an antifungal agent disposed in the barrier layer 26, as in the previous embodiment.

In either of the foregoing embodiments, the use of a colored or patterned layer 34 (e.g., a colored and/or patterned fabric layer) in combination with a transparent polymer can provide what appears to be a colored or patterned polymer article. This can create an article with much more color variations than would be possible with simply using colored or pigmented polymer. The use of patterned fabrics or metallic sheen fabrics or other variations in the aesthetic of layer 34 can impart these aesthetics to the polymer article; such aesthetics would be difficult or impossible to impart to the polymer article by pigmenting the polymer or printing the polymer article. This process also offers a potential economic advantage to coloring or printing the polymer.

The method(s) of the present disclosure can comprise one or more of the following advantages: 1) the method allows products to be formed comprising a plurality of pillars; 2) the individual pillars are capable of being compressed, as well as being capable of moving from side-to-side, which can be adapted to provide cushioning and vibration dampening in a variety of applications; 3) the thickness of the pillars and/or the spacing between the pillars can be tailored to provide desired impact and vibration absorption characteristics; 4) the products can be formed with pillars of varying thickness and/or spacing between the pillars, to provide products with regions of varying degrees of impact and vibration absorption; 5) the use of pillar regions can make the overall cushion much lighter and more flexible than it would be when made from solid polymer, while still maintaining the thickness of polymer necessary for cushioning. 6) the use of a relatively thin barrier layer and the release layer on opposite sides of the polymer layer allows relatively low durometer polymeric materials to be handled in molding equipment and by the equipment operators, without adhering to the equipment and/or operators; 7) the use of the relatively thin barrier layers allows the use of reduced total amounts of additives, which reduces costs; 8) the use of the relatively thin barrier layer allows relatively low durometer polymeric materials to be molded into a variety of shapes, sizes, densities, and to form articles in which the cross-sectional area varies in size, shape and density; 9) the use of the stabilizing layer reduces and/or eliminates shrinkage of the precursor, polymer and/or barrier layer during and after processing; and 10) when using a polyurethane gel, the process is capable of providing colorless and transparent articles that do not yellow, as is typical of polyurethanes after exposure to ultra-violet energy.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A cushioning member, comprising:
    a multilayer material comprising a barrier layer, a polymeric material layer disposed adjacent to the barrier layer, and a stabilization layer disposed adjacent to and opposite the barrier layer;
    a plurality of pillars disposed in the multilayer material, each of the plurality of pillars comprising an upper surface and a sidewall extending downwardly from and undercutting the upper surface to define a radiused upper edge disposed between the upper surface and the sidewall;
    a plurality of spacer regions disposed between the plurality of pillars, each of the plurality of spacer regions comprising a spacer region width of about 0.002 inch.

2. The cushioning member of claim 1, wherein the thickness of at least two of the plurality of pillars is different.

3. The cushioning member of claim 1, wherein the shape of at least two of the plurality of pillars is different.

4. The cushioning member of claim 1, wherein the thickness and the shape of at least two of the plurality of pillars is different.

5. The cushioning member of claim 1, wherein the plurality of pillars have a thickness of less than about 3 inches, and the plurality of spacer regions have a thickness of about 0.002".

6. The cushioning member of claim 1, wherein the plurality of pillars have a thickness of less than about 3 inches, and the plurality of spacer regions have a thickness of about 0.250".

7. The cushioning member of claim 1, wherein the barrier layer is selected from the group consisting of textiles, textile composites, thermoplastic elastomer (TPE) materials, and combinations comprising at least one of the foregoing.

8. The cushioning member of claim 7, wherein the barrier layer is a thermoplastic polyurethane (TPU).

9. The cushioning member of claim 1, wherein the barrier layer comprises an elongation of at least about 100 percent.

10. The cushioning member of claim 1, wherein the barrier layer has a thickness of less than or equal to about 5 mil.

11. The cushioning member of claim 1, wherein the barrier layer has a thickness of greater than or equal to about 5 mil.

12. The cushioning member of claim 1, wherein the barrier layer comprises a moisture transmittable material.

13. The cushioning member of claim 1, wherein the barrier layer comprises a phase changing material.

14. The cushioning member of claim 1, wherein the barrier layer comprises an active agent.

15. The cushioning member of claim 14, wherein the active agent is selected from the group consisting of an antimicrobial active agent, an antifungal agent, and combinations comprising at least one of the foregoing.

16. The cushioning member of claim 1, further comprising a fabric material layer disposed between the polymeric material layer and the stabilization layer.

17. The cushioning member of claim 16, wherein the fabric layer comprises knits, wovens, non-wovens, synthetics, non-synthetics, and combinations comprising at least one of the foregoing.

18. The cushioning member of claim 1, wherein at least one of the barrier layer and the stabilization layer comprise a fabric material layer comprising an elongation of at least about 100 percent.

19. The cushioning member of claim 18, wherein the fabric layer comprises knits, wovens, non-wovens, synthetics, non-synthetics, and combinations comprising at least one of the foregoing.

20. The cushioning member of claim 18, wherein the fabric layer is fluid-permeable.

21. The cushioning member of claim 1, further comprising an adhesive disposed between the polymeric material layer and the stabilization layer.

22. The cushioning member of claim 21, wherein the adhesive is disposed on a support layer.

23. The cushioning member of claim 22, wherein the support layer is a TPE.

24. The cushioning member of claim 1, wherein the stabilization layer is removable from the cushioning material.

25. The cushioning member of claim 1, wherein the ratio of the pillar thickness to the pillar width is about 8:1.

26. The cushioning member of claim 1, wherein the sidewall extends perpendicularly downwardly from the upper surface.

27. A cushioning member, comprising:
    a multilayer material comprising a barrier layer, a polymeric material layer disposed adjacent to the barrier layer, and a stabilization layer disposed adjacent to and opposite the barrier layer;
    a plurality of pillars disposed in the multilayer material, each of the plurality of pillars comprising a thickness and a width, and an upper surface and a sidewall extending downwardly from and undercutting the upper surface;

a plurality of spacer regions disposed between the plurality of pillars, each of the plurality of spacer regions comprising a spacer region thickness and a width of about 0.002 inch;

wherein the ratio of the pillar thickness to the pillar width is between about 2:1 and about 8:1.

28. The cushioning member of claim 27, wherein the thickness of at least two of the plurality of pillars is different.

29. The cushioning member of claim 27, wherein the shape of at least two of the plurality of pillars is different.

30. The cushioning member of claim 27, wherein the thickness and the shape of at least two of the plurality of pillars is different.

31. The cushioning member of claim 27, wherein the plurality of pillars has a thickness of less than about 3 inches, and the thickness of the plurality of spacer regions is about 0.002".

32. The cushioning member of claim 27, wherein the plurality of pillars has a thickness of less than about 3 inches, and the thickness of the plurality of spacer regions is about 0.250".

33. The cushioning member of claim 27, wherein the barrier layer is selected from the group consisting of textiles, textile composites, thermoplastic elastomer (TPE) materials, and combinations comprising at least one of the foregoing.

34. The cushioning member of claim 33, wherein the barrier layer is a thermoplastic polyurethane (TPU).

35. The cushioning member of claim 27, wherein the barrier layer comprises an elongation of at least about 100 percent.

36. The cushioning member of claim 27, wherein the barrier layer has a thickness of less than or equal to about 5 mil.

37. The cushioning member of claim 27, wherein the barrier layer has a thickness of greater than or equal to about 5 mil.

38. The cushioning member of claim 27, wherein the barrier layer comprises a moisture transmittable material.

39. The cushioning member of claim 27, wherein the barrier layer comprises a phase changing material.

40. The cushioning member of claim 27, wherein the sidewall extends perpendicularly downwardly from the upper surface.

\* \* \* \* \*